United States Patent
Glover et al.

(10) Patent No.: US 11,557,926 B2
(45) Date of Patent: Jan. 17, 2023

(54) SYSTEMS, DEVICES, AND/OR METHODS FOR MANAGING ELECTRICAL ENERGY FROM A BATTERY AND/OR FUEL CELL

(71) Applicant: Wireless electrical Grid LAN, WiGL Inc, Hampton, VA (US)

(72) Inventors: Ahmad L. D. Glover, Smithfield, VA (US); Alfred Lewis Anderson, Houston, TX (US)

(*) Notice: Subject to any disclaimer, the term of this patent is extended or adjusted under 35 U.S.C. 154(b) by 106 days.

(21) Appl. No.: 17/163,001

(22) Filed: Jan. 29, 2021

(65) Prior Publication Data

US 2022/0247227 A1  Aug. 4, 2022

(51) Int. Cl.
| | |
|---|---|
| H02J 7/00 | (2006.01) |
| H02J 50/40 | (2016.01) |
| H02J 50/23 | (2016.01) |
| H02J 50/27 | (2016.01) |
| H02J 50/80 | (2016.01) |
| H04W 84/12 | (2009.01) |
| H04W 52/04 | (2009.01) |

(52) U.S. Cl.
CPC .......... H02J 50/402 (2020.01); H02J 7/0013 (2013.01); H02J 7/0047 (2013.01); H02J 50/23 (2016.02); H02J 50/27 (2016.02); H02J 50/80 (2016.02); H04W 52/04 (2013.01); H04W 84/12 (2013.01); *H02J 2207/30* (2020.01)

(58) Field of Classification Search
None
See application file for complete search history.

(56) References Cited

U.S. PATENT DOCUMENTS

| | | | | |
|---|---|---|---|---|
| 10,317,963 | B1* | 6/2019 | DeVaul | G06F 1/26 |
| 2006/0045117 | A1* | 3/2006 | Qi | H04W 24/02 |
| | | | | 370/252 |
| 2013/0049484 | A1* | 2/2013 | Weissentern | H02J 50/80 |
| | | | | 307/104 |
| 2014/0091755 | A1* | 4/2014 | Walley | H02J 50/12 |
| | | | | 320/108 |

* cited by examiner

*Primary Examiner* — Arun C Williams
(74) *Attorney, Agent, or Firm* — Cooper & Assoc; Mark I. Cooper

(57) ABSTRACT

Certain exemplary embodiments can provide a system, which comprises a multi point power charger coupleable to different types of an electrical energy source such as a battery or a fuel cell. The multipoint power charge can detect the type of connected energy source and activate one of a plurality of converters, wherein the activated converter is compatible with the connected energy source. The multi point power charger is constructed to emit a plurality of directional beams directable toward a determined direction of an electronic device that is chargeable via the multi point power charger. Also, a portable wireless charging device with at least two types of interchangeable power supplies.

24 Claims, 25 Drawing Sheets

SYSTEMS, DEVICES, AND/OR METHODS FOR MANAGING ELECTRICAL ENERGY FROM A BATTERY AND/OR FUEL CELL

BACKGROUND

Patent publication nos. US201762506737A1 and US20200067341A1, which are hereby incorporated herein by reference in their entireties, disclose electronic device charging via a wireless electrical grid location (WiGL) energy system receiving power from an electrical grid, such as an electrical wall outlet.

SUMMARY

The present invention is directed to a local area network comprising an electronic device, an electrical energy source, which may be one of two or more different types, and which may be portable, for powering or charging the electronic device, and a multipoint wireless power charger that converts power from the electrical energy source and transmits it wirelessly to the electronic device. The electrical energy source can be one of at least two types, such as a battery or fuel cell, preferably a portable battery or fuel cell. For example, the battery can be a saltwater battery, such as a magnesium air battery. The multipoint wireless power charger can be "plug and play", e.g., it can comprise a plurality of converters and a controller to detect a type of the electrical energy source connected to the local area network and to activate one of the plurality of converters that is compatible with the detected type of electrical energy source.

In one aspect, a system is embodied in an ad hoc local area network comprising a multi point wireless power charger and an electrical energy source, the multi point power charger coupleable to the electrical energy source, the multi point power charger constructed to emit a plurality of directional beams, wherein each of the plurality of directional beams is directable toward a determined direction of an electronic device with a receiver, wherein the multi point power charger is constructed to wirelessly charge or power the electronic device.

The multi point power charger comprises:
a plurality of converters that are constructed to convert electrical energy from the electrical energy source having an alternating current or direct current into wireless electrical energy; a base band processor;
a processor comprising a plurality of local oscillators, a plurality of band pass filters, a plurality of phase shifters, and a plurality of power amplifiers;
a multidirectional antenna array constructed to emit substantially wireless directional beams, wherein each substantially wireless directional beam flows to the antenna via one of the plurality of local oscillators, one of the plurality of band pass filters, one of the plurality of phase shifters, and one of the plurality of power amplifiers, the wireless directional beams:
  directed in any of a plurality of directions; and
  transmitted substantially wirelessly via a locally available electromagnetic energy spectrum; and
a system controller constructed to:
  detect a type of the electrical energy source and activate a one of the converters compatible with the detected type of the electrical energy source;
  enable the electronic device to be followed by the electromagnetic energy spectrum charging beam responsive to motion of the electronic device; and
  allow for formation of the ad hoc network and repeatedly calculate a position of the electronic device so as to redirect the electromagnetic energy spectrum charging beam;
wherein the electronic device requests charging;
wherein the multi point power charger is constructed to:
  determine a location of the electronic device;
  direct one of the plurality of directional beams toward the determined location of the electronic device to charge or power the electronic device;
  automatically update the location of the electronic device, redirect one of the plurality of directional beams toward the updated location of the electronic device; and
  provide a plurality of wireless electromagnetic energy spectrum transmissions into a general location, wherein the electronic device is charged in range within which the multi point power charger can cause a self-charge or recharge, and
wherein a charging beam is selected based on an optimum power delivered to the electronic device based on a status of the connected electrical energy source and at least one of a requested speed of charging, the proximity of available power transmission sources in the network and/or a level of charge of a battery comprised by the electronic device.

In another aspect, a method is embodied in:
causing an electronic device, coupled to an ad hoc local area network comprising an electrical energy source, to charge or be powered via a multi point wireless power charger, the multi point power charger coupleable to the local area network and connected to the electrical energy source comprising a first type of power source or a second type of power source, the multi point power charger comprising a controller to detect the type of the connected electrical energy source;
wherein the multi point power charger comprises at least first and second converters, the first converter activated by the controller to convert electrical energy from the first type of power source into wireless electrical energy when the first type of power source is detected by the controller and the second converter activated by the controller to convert electrical energy from the second type of power source into wireless electrical energy when the second type of power source is detected;
wherein the multi point power charger is constructed to direct a beam of electrical energy toward the electronic device, the multi point power charger comprising a processor and an antenna, the radio frequency processor comprising a plurality of local oscillators, a plurality of band pass filters, a plurality of phase shifters, and a plurality of power amplifiers, wherein the beam of electrical energy flows to the antenna via one of the plurality of local oscillators, one of the plurality of band pass filters, one of the plurality of phase shifters, and one of the plurality of power amplifiers, the multi point power charger selected responsive to a first determination of a location of the electronic device and a second determination that a charging request has been received the electronic device, the beam of electrical energy directed responsive to the determination of the location of the electronic device, wherein the electronic device requests charging, wherein the multi point power charger is constructed to:
  determine the location of the electronic device;
  direct one of the plurality of directional beams toward the determined location of the electronic device to charge or power the electronic device;
  automatically update the location of the electronic device, redirect one of the plurality of directional beams toward the updated location of the electronic device; and provide a plurality of wireless electrical power transmission into a general location, wherein the electronic device is charged in a range within which the multi point power charger can cause a self-charge or recharge; and wherein a charging element is selected based on an optimum power delivered to the electronic device based on the type of the connected electrical energy power source detected by the controller and at least one of:

a requested speed of charging;

a level of charge of a battery comprised by the electronic device; and/or a status of the connected electrical energy source.

In a further aspect, the invention is embodied in a portable wireless charging apparatus, comprising:

a housing in which are mounted a power source and a wireless charging unit connected to the power source;

the power source comprising a battery or a fuel cell;

the wireless charging unit comprising a first converter for converting power from the battery when the battery is connected and a second converter for converting power from the fuel cell when the fuel cell is connected;

a system controller in the wireless charging unit to detect whether the connected power source is the battery or the fuel cell, activate the first converter and inactivate the second converter when the battery is detected, and activate the second converter and inactivate the first converter when the fuel cell is detected;

an ad hoc local area network comprising the wireless charging unit and an electronic device with a receiver, the wireless charging unit constructed to emit a plurality of directional beams, wherein each of the plurality of directional beams is directable toward a determined direction of the electronic device, the multi point power charger constructed to wirelessly charge or power the electronic device, the multi point power charger comprising:

a base band processor;

an electromagnetic spectrum processor comprising a plurality of local oscillators, a plurality of band pass filters, a plurality of phase shifters, and a plurality of power amplifiers;

a multidirectional antenna array, the multidirectional antenna array constructed to emit substantially wireless directional beams, wherein each substantially wireless directional beam flows to the antenna via one of the plurality of local oscillators, one of the plurality of band pass filters, one of the plurality of phase shifters, and one of the plurality of power amplifiers, the wireless directional beams:

directed in any of a plurality of directions; and transmitted substantially wirelessly via a locally available electromagnetic energy spectrum; and wherein the system controller is constructed to:

enable the electronic device to be followed by the electromagnetic energy spectrum charging beam responsive to motion of the electronic device; and allow for formation of the ad hoc network and repeatedly calculate a position of the electronic device so as to redirect the electromagnetic energy spectrum charging beam; wherein:

the electronic device requests charging;

the multi point power charger is constructed to:

determine a location of the electronic device;

direct one of the plurality of directional beams toward the determined location of the electronic device to charge or power the electronic device;

automatically update the location of the electronic device, redirect one of the plurality of directional beams toward the updated location of the electronic device; and provide a plurality of wireless electromagnetic energy spectrum transmissions into a general location, wherein the electronic device is charged is in range within which the multi point power charger can cause a self-charge or recharge, and wherein a charging beam is selected based on an optimum power delivered to the electronic device based on a status of the connected power source and at least one of a requested speed of charging, the proximity of available power transmission sources in the network and/or a level of charge of a battery comprised by the electronic device.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system, which comprises a multi point power and multi point power charger ("multi point power charger"). The multi point power charger is coupleable to different types of an electrical energy source, e.g., for portability. The multi point charger has a plurality of converters specific for use with the different types of electrical energy source, and a controller to detect the type of power source connected and activate a compatible one of the plurality of converters, e.g., for "plug and play" functionality. The multi point power charger is constructed to emit a plurality of directional beams. Each of the plurality of directional beams is directable toward a determined direction of an electronic device that is powered or chargeable via the multi point power charger. Certain exemplary embodiments provide an electrical power distribution network that utilizes packet switching. Certain exemplary embodiments add redundancy by proving routing resiliency similar to methods used in data communication. Certain exemplary embodiments substantially eliminate charging cords. Certain exemplary embodiments eliminate and/or reduce demands for electrical wiring. Certain exemplary embodiments allow for the use of various different power sources and/or provide for portability and versatility of the wireless charging system. Certain exemplary embodiments reduce wasted charging power by requesting only what is desired. Certain exemplary embodiments reduce battery uses. Certain exemplary embodiments provide an adaptable multi point power charger, which utilizes a smart antenna and is coupleable to an ad hoc network. The multi point power charger adaptively directs power to power and/or charge remote devices. The multi point power charger is relatively efficient and reduces ambient radio frequency ("RF") power to provide low interference.

Figure 1:
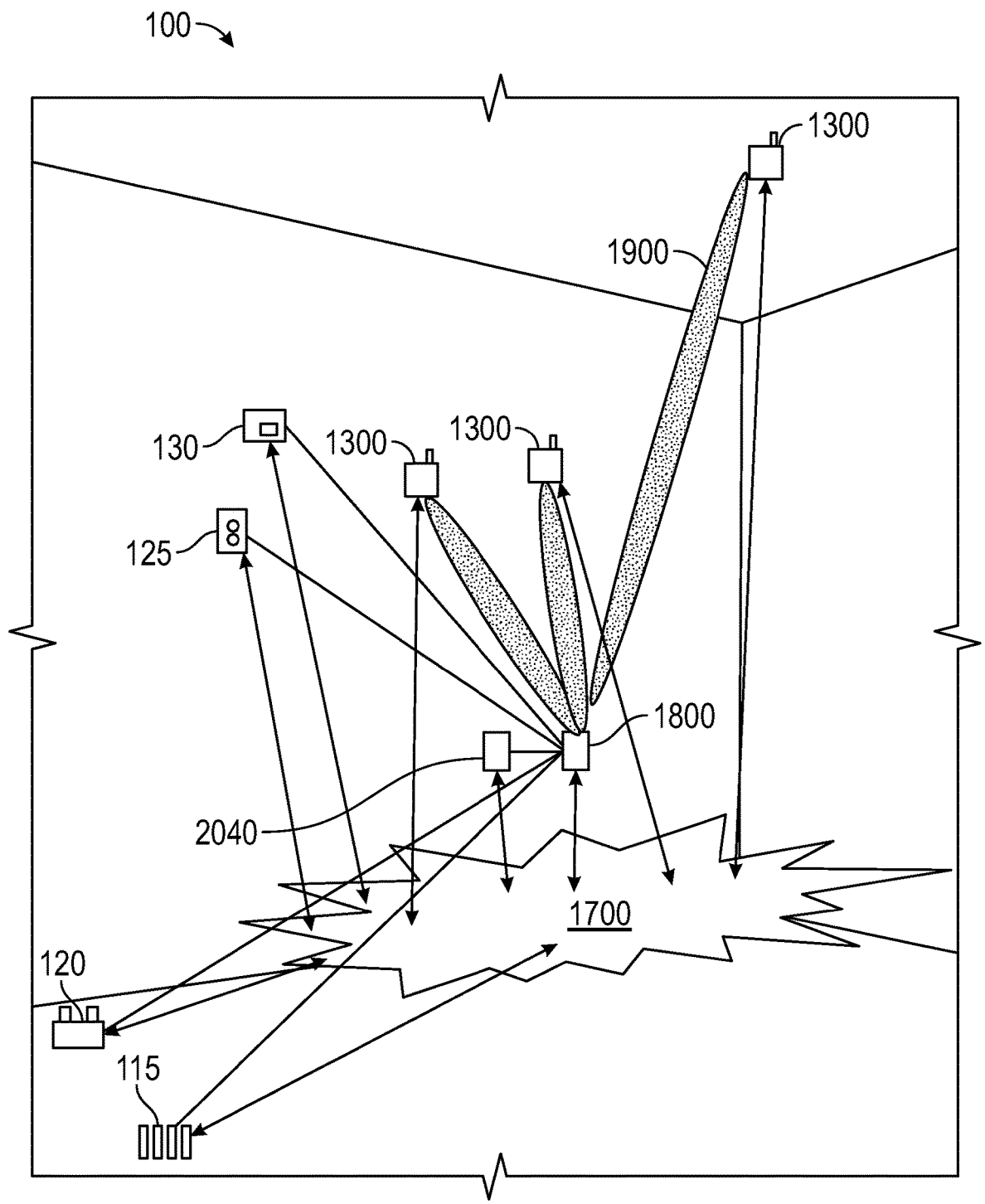
FIG. 1 is a block diagram of an exemplary embodiment of a system 100.
Figure 2:
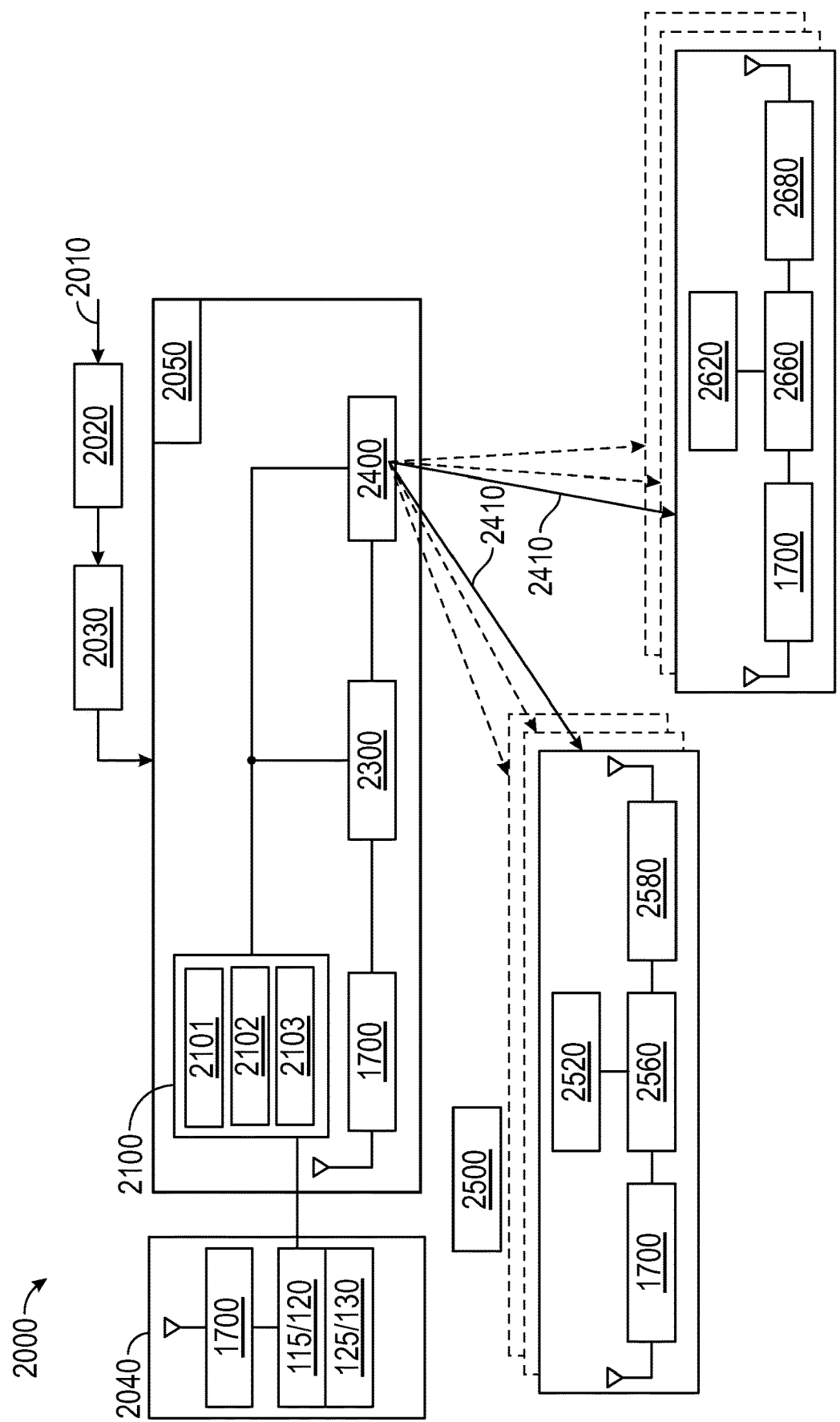
FIG. 2 is a block diagram of an exemplary embodiment of a system 200.

FIG. 1 is a block diagram of an exemplary embodiment of a system 100. One or more multi point power chargers 1800 can be electrically coupled to electrical energy source 2040 such as fuel cell 115, battery 120, electrical outlet 125, USB outlet 130, and so on, as illustrated. Multi point power charger 1800 can be electrically and/or communicatively coupled to electronic devices 1300 (which can be one of a plurality of relatively low power un-tethered devices. The charger 1800 and electronic devices 1300 can be connected to a WiGL network 1700. As best seen in FIG. 2, electrical energy source 2040 (and/or 115, 120, 125, 130) can be smart devices also connected to the WiGL network 1700, e.g., via a Bluetooth device. Multi point power charger 1800 can mount and/or be coupled to electrical energy sources 2040, 115, 120, 125, 130 and so on, and generate directional beams 1900 (which directional beams provide power to system devices 1300) directed to one or more devices 1300 that are chargeable. Multi point power charger 1800 can be communicatively coupled to a local area network ("LAN"), and/or a personal area network ("PAN"), and/or a wireless LAN ("WLAN"), and/or a wireless PAN ("WPAN"), collectively herein referred to as "WP/LAN" or WiGL 1700 to communicate information concerning one or more of:

identify one or more devices in need of power or charging;

location information concerning one or more devices; and/or a selection of a power or charge controller to power or charge one or more identified devices. One or more identified devices 1300 can request charging from multi point power charger 1800. A directional beam of directional beams 1900 can be assigned to the device requesting power or a charge to begin operating or charging. Certain exemplary embodiments update device locations as devices move. Thereby, selected multi point power charger 1800 providing powering and recharging can be powered or changed based upon movement of a given device. Power transmitted via RF or other electromagnetic radiation ("EMR") sources can be dynamically adjusted based upon device location and power and/or charging need. Multi point power charger 1800 generates directed beams of power to target a device that needs and/or requests power and/or charging. Multi point power chargers 1800 can be communicatively coupled to WP/LAN 1700 to communicate information such as:

each device that requests power or charging is assigned a number and becomes a node of the network;

each device that requests power or charging can elect to request to be powered, charged or not;

what devices need to be powered and/or charged;

where each device to located and/or if there are a plurality of multi point power chargers 1800 (see FIGS. 3 and 22), which multi point power charger 1800 charges which device; etc.

Mobile devices are communicatively coupled to WP/LAN 1700. If a mobile device needs and/or requests power and/or charging, the mobile device sends a request via WP/LAN 1700. A directional beam is assigned to the mobile device and direct powering and/or charging starts. Locations of devices are repeatedly updated.

Figure 3:
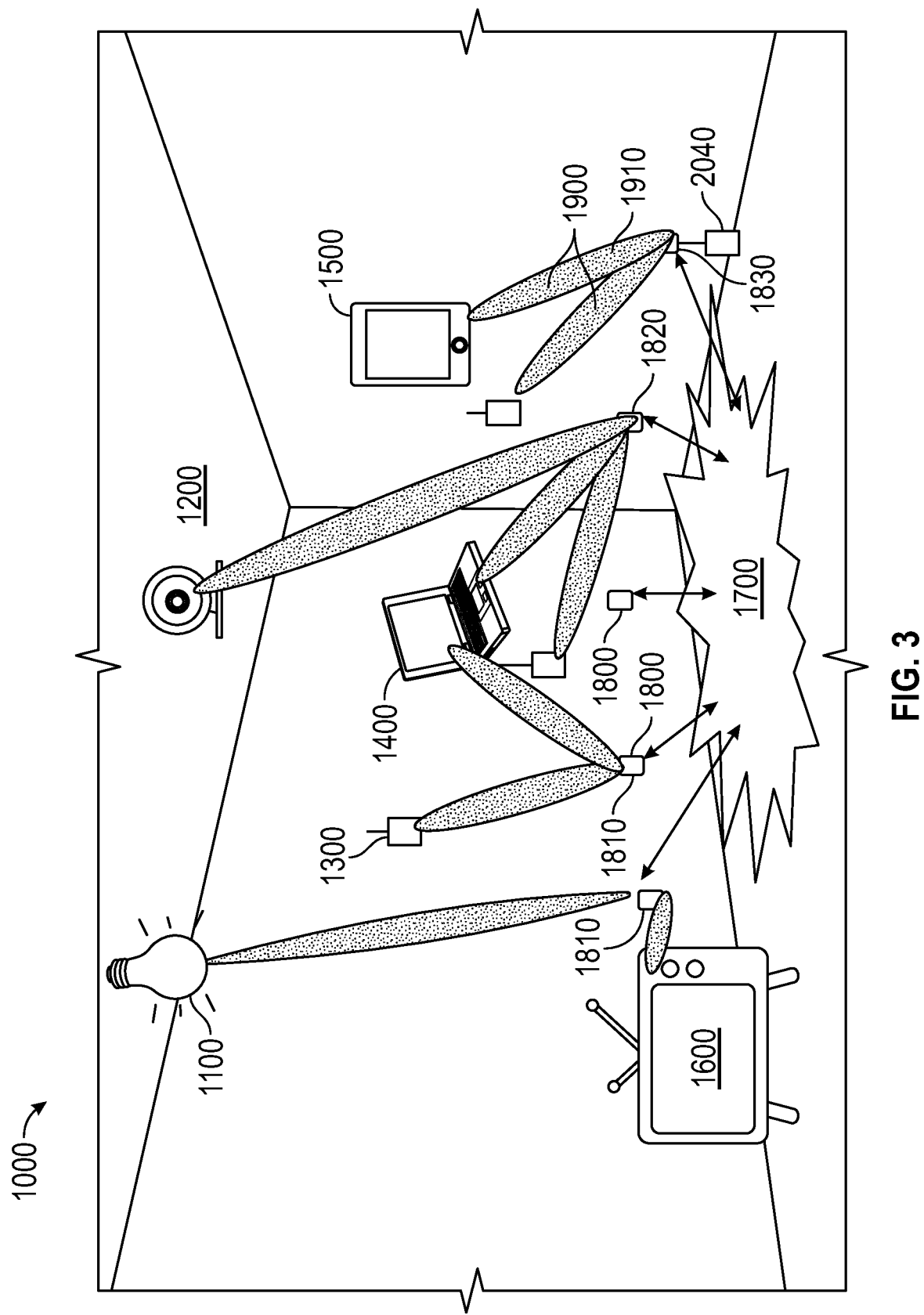
FIG. 3 is a block diagram of an exemplary embodiment of a system 1000.
Figure 5:
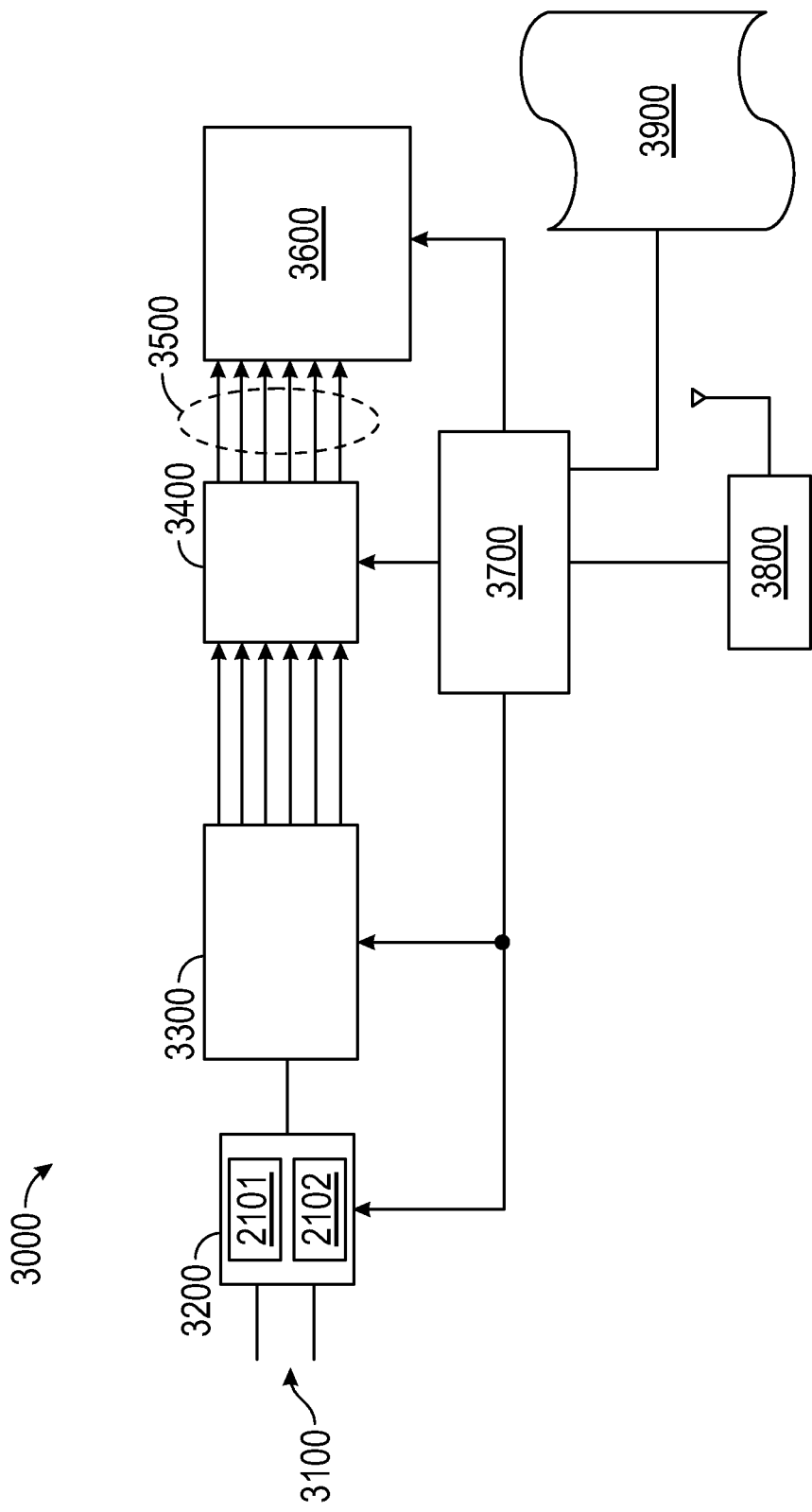
FIG. 5 is a block diagram of an exemplary embodiment of a system 3000.
Figure 23:
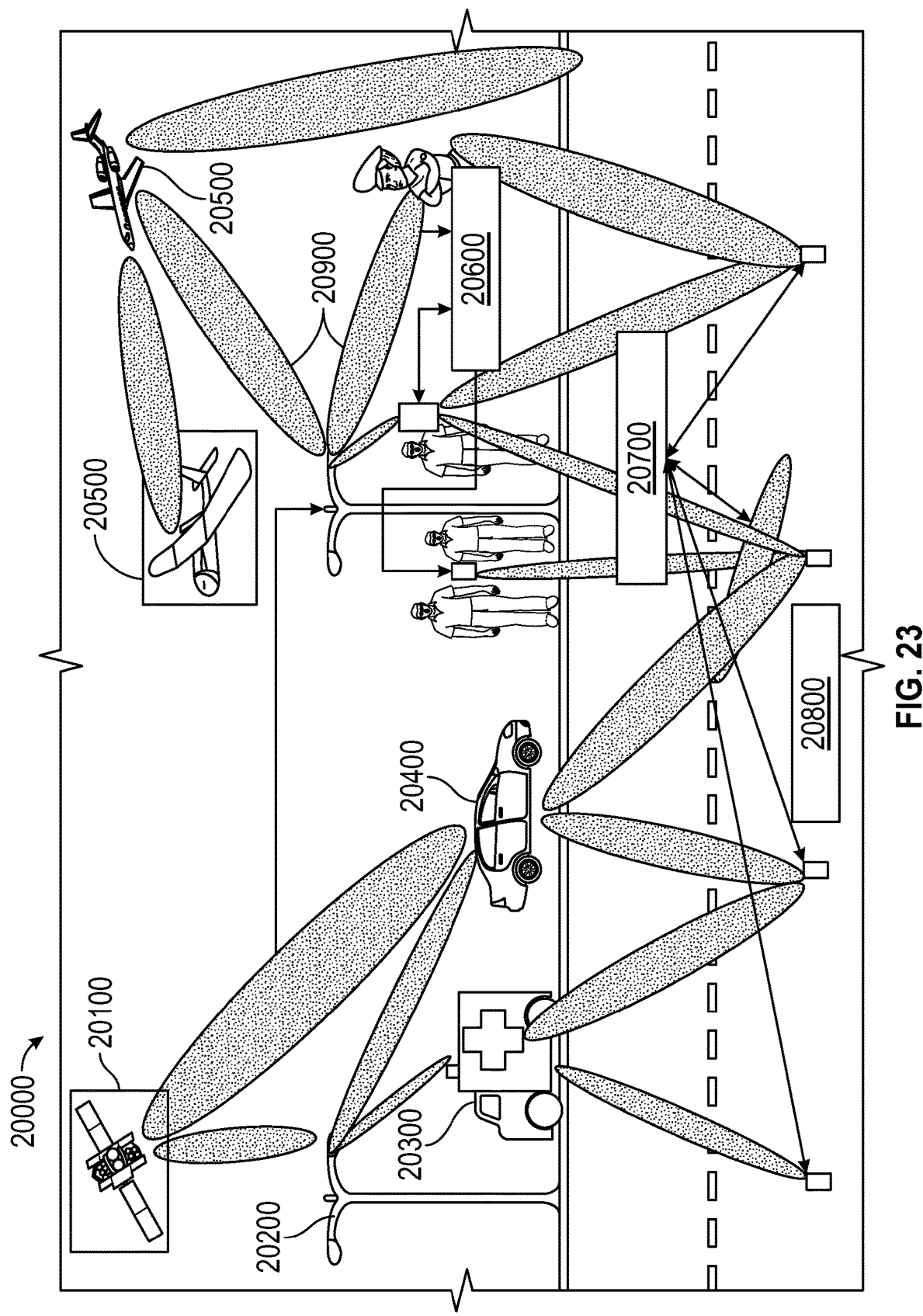
FIG. 23 is a block diagram of an exemplary embodiment of a system 20000.

A system 100 comprises a multi point power charger 1800, which can, if desired, be one of a plurality of multi point power chargers 1800, as best illustrated in FIGS. 3 and 23. Multi point power charger 1800 is coupleable to an electrical energy source 2040, which can be a fuel cell 115, battery 120, wall outlet 125, USB port 130, etc. Multi point power charger 1800 is constructed to emit a plurality of directional beams 1900. Wherein each of plurality of directional beams 1900 is directable toward a determined direction of an electronic device 1300. Multi point power charger 1800 is constructed to wirelessly charge and/or wirelessly power electronic device 1300. Multi point power charger 1800 can comprise:

a converter unit (see e.g., converter unit 2100 of FIG. 2 or converter 3200 of FIG. 5) that is constructed to convert electrical energy having an alternating current or direct current, such as from solar energy sources, a battery, a fuel cell, a wall outlet, a USB port, a solar array, or the like, into wireless electrical energy;

a base band processor (see e.g., base band processor 3300 of FIG. 5);

an RF and/or an electromagnetic radiation ("EMR") processor (see e.g., RF processor 3400 of FIG. 5);

an electromagnetic radiation processor (e.g. radio frequency processor);

a multidirectional antenna array;

a wireless electrical grid router;

a multidirectional antenna array (see e.g., multidirectional antenna array 3600 of FIG. 5), the multidirectional antenna array constructed to route and emit substantially wireless directional beams 1900 that are at least one of:

directed in any of a plurality of directions; and transmitted substantially wirelessly via a locally available electromagnetic radiation, piezoelectricity, nanocrystal, or RF signal, RF signal comprising a RF charging beam 1910; and/or a system controller constructed to:

route energy based on a wireless electrical grid policy and routing tables;

detect a type of the electrical energy source and activate a one of the converters compatible with the detected type of the electrical energy source;

enable electronic device 1300 to be followed by the electromagnetic radiation (e.g. radio frequency) charging beam 1910 (which can be one of plurality of directional beams 1900) responsive to motion of electronic device 1300; and allow for a formation of an Ad Hoc network and repeatedly calculates a position of electronic device 1300 so as to redirect the electromagnetic radiation (e.g. radio frequency) charging beam (i.e., one of plurality of directional beams 1900).

Multi point power charger 1800 is constructed to:

determine a location of electronic device 1300;

direct one of plurality of directional beams 1900 toward the determined location of electronic device 1300 to charge and/or power electronic device 1300;

provide plurality of directional beams 1900 via electromagnetic radiation (e.g. radio frequency) into a general location, whereby electronic device 1300 is charged when in a range within which multi point power charger 1800 can cause a self-charge or recharge; provide a plurality of wireless electrical power electromagnetic radiations such as radio frequency transmissions (i.e., plurality of directional beams 1900) into a general location, wherein electronic device 1300 is charged when in a range within which multi point power charger 1800 can cause a self-charge, wirelessly power, and/or recharge;

provide electrical energy wirelessly to any detected device (e.g., electronic device 1300) that requests electrical energy;

automatically update the location of electronic device 1300; and/or redirect and/or route one of a plurality of directional beams 1900 toward the updated location of electronic device 1300, etc.

A signal can be received by the multi point power charger 1800 indicating:

a charging request from electronic device 1300; and which of a plurality of directional beams 1900 will be providing electrical energy to electronic device 1300.

Multi point power charger 1800 can be one of plurality of the multi point power chargers 1800. A signal can be received by multi point power charger 1800 indicating:

a charging request from electronic device 1300; and which of plurality of multi point power chargers 1820 will be providing electrical energy to electronic device 1300.

Multi point power charger 1800 can be dynamically selected from a plurality of multi point power chargers based upon a determined location of electronic device 1300.

Machine instructions (e.g., machine instructions 3900 of FIG. 5) can cause the electronic device 1300 to be powered and/or charged via multi point power charger 1800.

In certain exemplary embodiments, the energy is provided via a laser. In certain exemplary embodiments, the energy is provided responsive to a quality of service request from a user of the electronic device. In certain exemplary embodiments, energy is provided to the electronic device from another electronic device in the network.

FIG. 2 is a block diagram of an exemplary embodiment of a system 2000, which comprises a power generation source 2010, a long haul transmission line 2020, a tower 2030, a WiGL multi point power charger 2050 (which can be connected to one of power sources 2040, 115, 120, 125, 130), mobile units 2500, and mobile units 2600. Power source 2040 is electrically connected to charger 2050 and communicatively coupled to WiGL network 1700. WiGL multi point power charger 2050 comprises converter unit 2100 and a controller 2300. Converter unit 2100 can contain a plurality of converters 2101, 2102, 2103, etc., specifically adapted to convert input power from a specific one of the power sources 2040, 115, 120, 125, or 130 to an output power as required by the charger 2050. The controller 2300 is configured to detect the type of power source that is connected and to activate the appropriate converter. The type of power source can be detected, for example, by sensing a voltage level and/or whether the power source is alternating current or direct current. Alternatively, the type of power source can be communicated via the WiGL network 1700.

Charger 2050 is communicatively coupled to a WiGL network 1700 and is constructed with an antenna 2400 to transmit multi-directional beams 2410. Mobile units 2500 comprise a battery charger 2520, a controller 2560, and a receiver 2580. Mobile units are communicatively coupled to WiGL network 1700. Mobile units 2600 comprise a battery charger 2620, a controller 2660, and a receiver 2680. Mobile units 2500 and 2600 are communicatively coupled to WiGL network 1700. Mobile units 2500 and mobile units 2600 consume energy.

The multi point power charger 2000 is augmented by a controller 2300. The system provides RF beam forming capabilities, which RF beams are formed and directed via communications transmitted via a formed AdHoc WiGL network. This AdHoc WiGL network may be created by software (code, application or other methods as outlined in the Institute of Electrical and Electronics Engineers (IEEE) standard 802.11) to determine the size, scope and needs of the WP/LAN. When an untethered device (e.g., an electronic device) needs charging, it requests charging via a signal transmitted via the AdHoc WiGL network. A particular multi point power charger is selected by an information device coupled to the AdHoc WiGL network, which causes generation of a directed beam that is a radio frequency ("RF") beam. The information device determines the location of the untethered device and assigns a different beam if necessary. RF transmitted power is dynamically adjusted based the location and charging needs of the untethered device.

The following portion of the detailed description in connection with FIGS. 3-22 is discussed in reference to an exemplary embodiment wherein the power source is a wall outlet and wherein the multi point charger is one of a plurality of multi point chargers, for the purposes of illustration and clarity, with the understanding that other power sources could be used as discussed above.

FIG. 3 is a block diagram of an exemplary embodiment of a system 1000. A plurality of multi point power chargers 1800 can be electrically coupled to electrical energy sources 1810 (e.g., electrical outlets as illustrated). Plurality of multi point power chargers 1800 can be electrically and/or communicatively coupled to devices (e.g., to a handheld device 1500, home security system 1200, relatively high power un-tethered devices 1400, electronic device 1300 (which can be one of a plurality of relatively low power un-tethered devices), a light fixture 1100, and/or a TV/home gateway 1600, etc. as illustrated).

A system 1000 comprises a multi point power charger 1820, which is one of plurality of multi point power chargers 1800. Multi point power charger 1820 is coupleable to an electrical energy source 1810. Multi point power charger 1820 is constructed to emit a plurality of directional beams 1900. Wherein each of plurality of directional beams 1900 is directable toward a determined direction of an electronic device 1300. Multi point power charger 1820 is constructed to wirelessly charge and/or wirelessly power electronic device 1300. Multi point power charger 1820 can comprise:

a converter unit (see e.g., converter unit 2100 of FIG. 2 and/or converter unit 3200 of FIG. 5) that is constructed to convert electrical energy having an alternating current or direct current, such as from batteries, fuel cells, solar energy sources, wall outlet, USB outlet, or the like, into wireless electrical energy;

a base band processor (see e.g., base band processor 3300 of FIG. 3);

a RF and/or an electromagnetic radiation ("EMR") processor (see e.g., RF processor 3400 of FIG. 5);

an electromagnetic radiation processor (e.g., radio frequency processor);

a multidirectional antenna array;

a wireless electrical grid router;

a multidirectional antenna array (see e.g., multidirectional antenna array 3600 of FIG. 5), the multidirectional antenna array constructed to route and emit substantially wireless directional beams 1900 that are at least one of:

directed in any of a plurality of directions; and transmitted substantially wirelessly via a locally available electromagnetic radiation, piezoelectricity, nanocrystal, or RF signal, RF signal comprising a RF charging beam 1910; and/or a system controller constructed to:

route energy based on a wireless electrical grid policy and routing tables enable electronic device 1300 to be followed by the electromagnetic radiation (e.g., radio frequency) charging beam 1910 (which can be one of plurality of directional beams 1900) responsive to motion of electronic device 1300; and allow for a formation of an Ad Hoc network and repeatedly calculates a position of electronic device 1300 so as to redirect the electromagnetic radiation (e.g. radio frequency) charging beam (i.e., one of plurality of directional beams 1900).

Multi point power charger 1820 is constructed to:

determine a location of electronic device 1300;

direct one of plurality of directional beams 1900 toward the determined location of electronic device 1300 to charge and/or power electronic device 1300;

provide a plurality of directional beams 1900 via electromagnetic radiation (e.g., radio frequency) into a general location, whereby electronic device 1300 is charged when in a range within which multi point power charger 1820 can cause a self-charge or recharge; provide a plurality of wireless electrical power electromagnetic radiations such as radio frequency transmissions (i.e., plurality of directional beams 1900) into a general location, wherein electronic device 1300 is charged when in a range within which multi point power charger 1820 can cause a self-charge, wirelessly power, and/or recharge;

provide electrical energy wirelessly to any detected device (e.g., electronic device 1300) that requests electrical energy;

automatically update the location of electronic device 1300; and/or redirect and/or route one of plurality of directional beams 1900 toward the updated location of electronic device 1300, etc.

A signal can be received by the multi point power charger 1820 indicating:

that a charging request from electronic device 1300; and which of plurality of directional beams 1900 will be providing electrical energy to electronic device 1300.

Multi point power charger 1820 can be one of plurality of the multi point power chargers 1800. A signal can be received by multi point power charger 1820 indicating:

a charging request from electronic device 1300; and which of plurality of multi point power chargers 1820 will be providing electrical energy to electronic device 1300.

Multi point power charger 1820 can be dynamically selected from plurality of multi point power chargers based upon a determined location of electronic device 1300.

Machine instructions (e.g., machine instructions 3900 of FIG. 3) that cause the electronic device 1300 to be powered and/or charged via multi point power charger 1820.

In certain exemplary embodiments, the energy is provided via a laser. In certain exemplary embodiments, the energy is provided responsive to a quality of service request from a user of the electronic device. In certain exemplary embodiments, energy is provided to the electronic device from another electronic device in the network.

Figure 4:
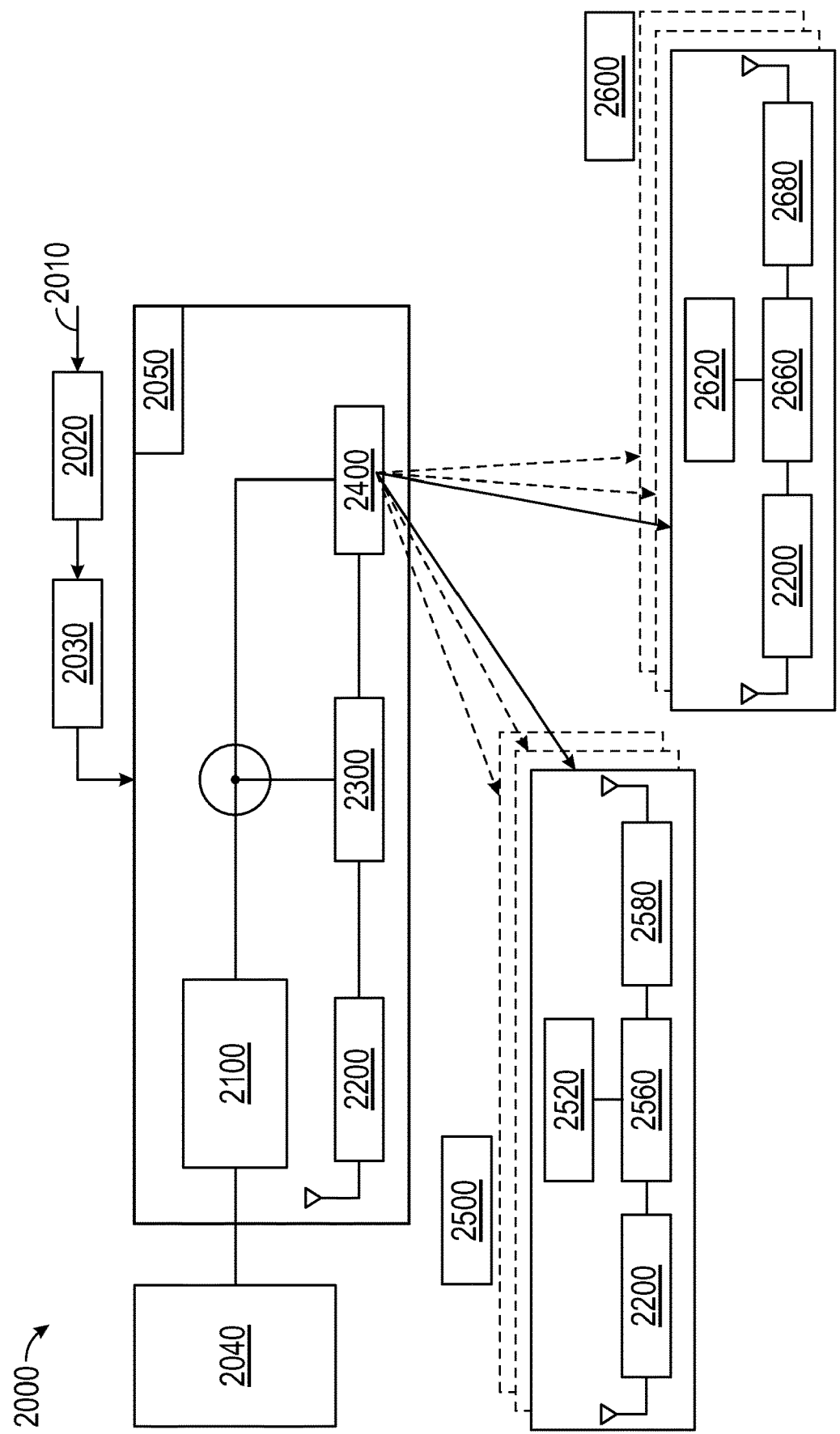
FIG. 4 is a block diagram of an exemplary embodiment of a system 2000.

FIG. 4 is a block diagram of an exemplary embodiment of a system 2000, which comprises a power generation source 2010, a long haul transmission line 2020, a tower 2030, a WiGL multi point power charger 2050 (which can be wall mounted or connected to a battery, fuel cell, solar source, USB outlet, etc.), mobile units 2500, and mobile units 2600. WiGL multi point power charger 2050 comprises energy source 2040 and converter unit 2100 (which can include a wall alternating current ("AC") to direct current ("DC") energy converter and/or a DC to DC converter where the output voltage is different) and a controller 2300. Charger 2050 is communicatively coupled to a WP/LAN 2200 and is constructed to transmit multi-directional beams 2400. Mobile units 2500 comprise a battery charger 2520, a controller 2560, and a receiver 2580. Mobile units are communicatively coupled to WP/LAN 2200. Mobile units 2600 comprise a battery charger 2620, a controller 2660, and a receiver 2680. Mobile units are communicatively coupled to WP/LAN 2200. Mobile units 2500 and mobile units 2600 consume energy.

FIG. 5 is a block diagram of an exemplary embodiment of a system 3000. Power 3100 from a battery, fuel cell, USB port, solar source, wall outlet, and so on, enters system 3000 and is converted to specification power via converter unit 3200. System 3000 comprises a base band processor 3300, an RF processor 3400, a beam formation control 3500, a multidirectional antenna array 3600 (which can comprise an antenna—e.g., a parabolic antenna), a system controller 3700, a LAN 3800, and machine instructions 3900.

Figure 6:
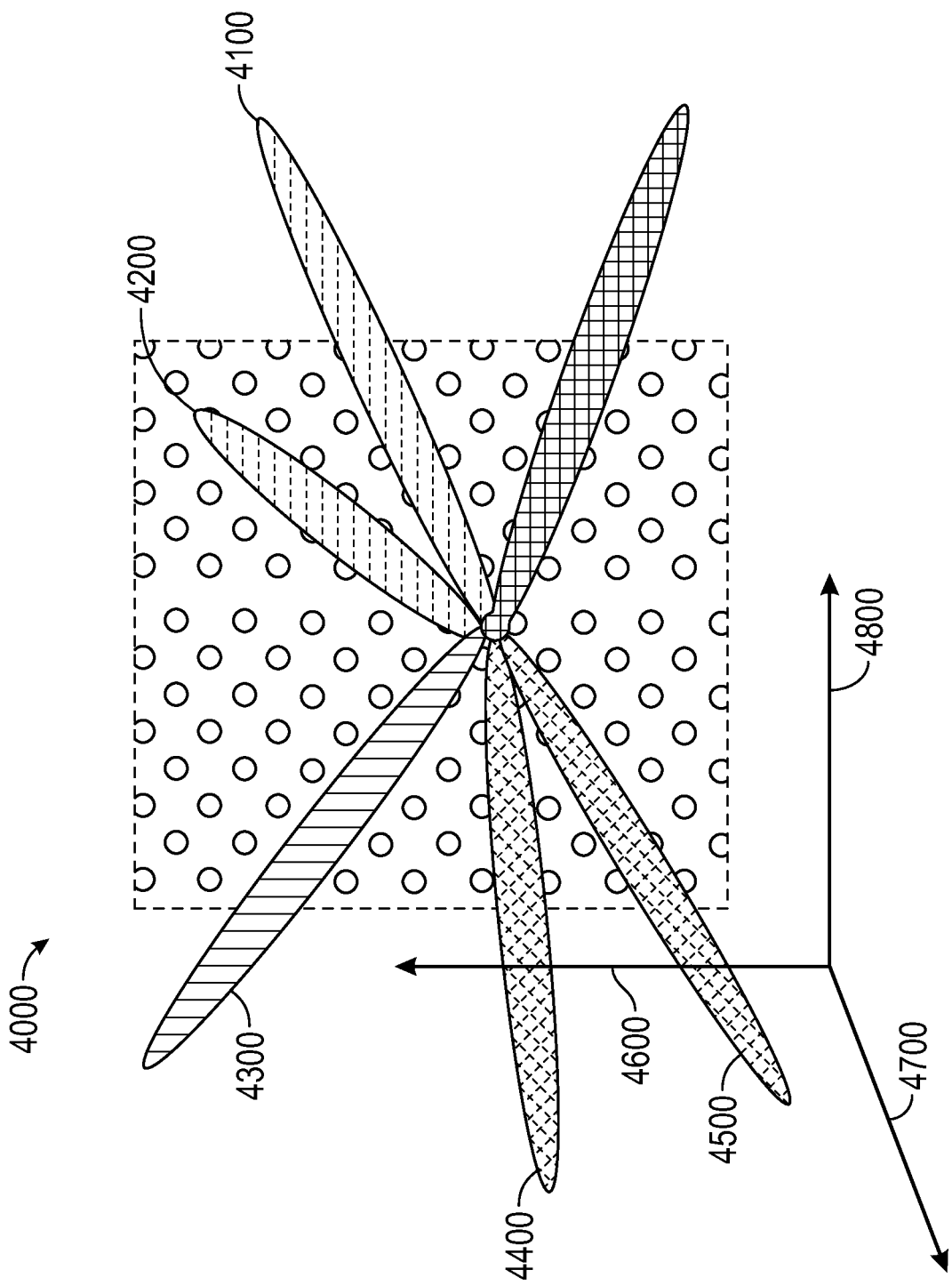
FIG. 6 is a block diagram of an exemplary embodiment of a multi directional antenna array 4000.

FIG. 6 is a block diagram of an exemplary embodiment of a multi directional antenna array 4000. RF Energy is directed to a mobile device on a transmit side. The system detects a presence of the mobile device and assigns a charging RF beam for it. Multi directional antenna array 4000 transmits a first charging beam 4100, a second charging beam 4200, a third charging beam 4300, a fourth charging beam 4400, and a fifth charging beam 4500. Each charging beam can be directed in three-dimensional space relative to an x-axis 4800, a y-axis 4600, and a z-axis 4700. Via multi directional antenna array 4000, radio frequency energy is directed to a mobile device on the transmit side. Certain exemplary systems can detect the presence of a mobile device and assigns a charging radio frequency beam for the mobile device.

Figure 7:
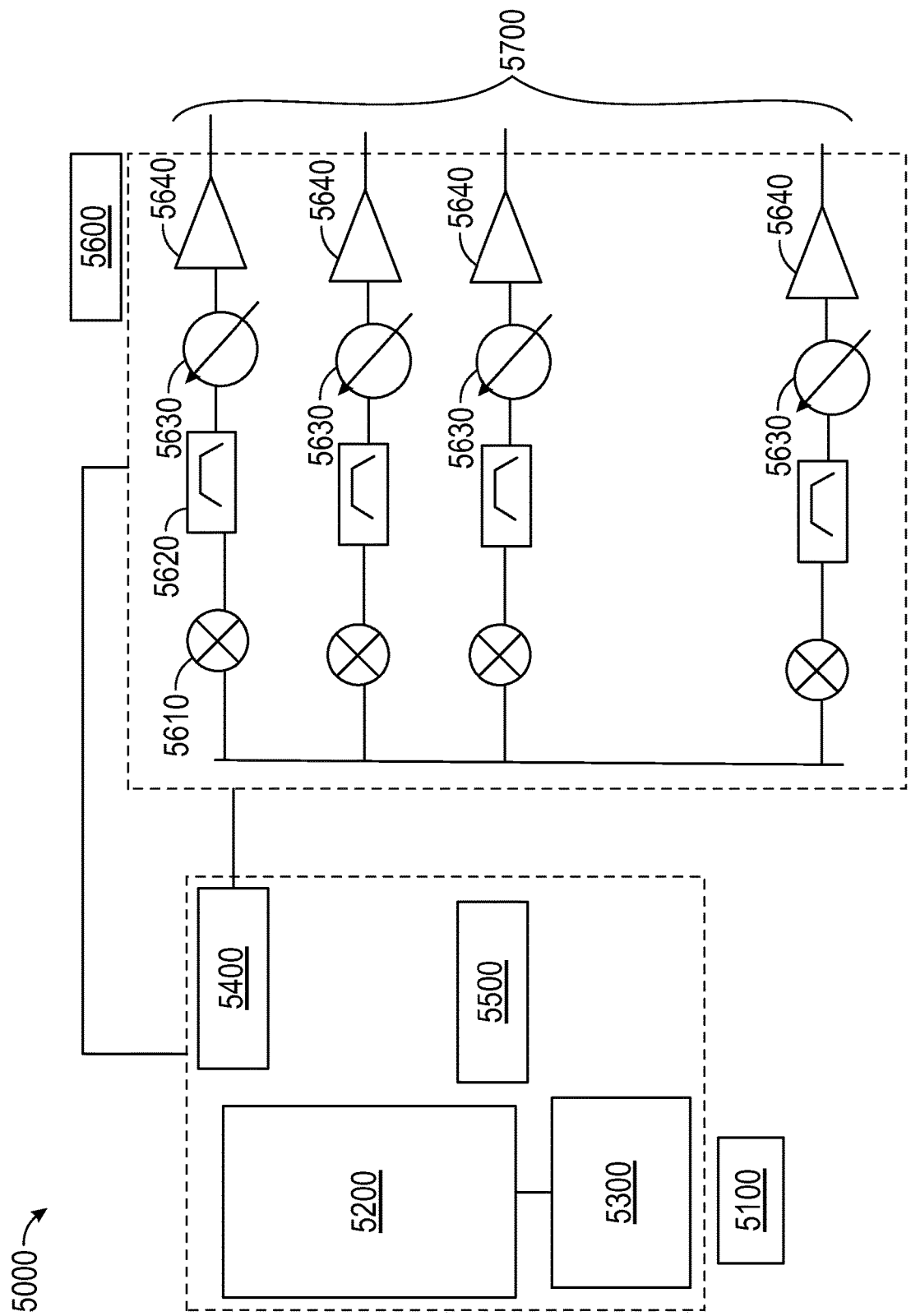
FIG. 7 is a block diagram of an exemplary embodiment of a wall mounted or battery coupled multi point power charger system 5000.

FIG. 7 is a block diagram of an exemplary embodiment of a battery coupled multi point power charger system 5000, which comprises a baseband processor 5100 and an RF processor 5600. Baseband processor 5100 comprises a processor 5200, a controller 5300, modulators 5400, and beam control 5500. RF processor 5600 comprises a plurality of local oscillators 5610, a plurality of band pass filters 5620, a plurality of phase shifters 5630, and a plurality of power amplifiers 5640 (e.g., power boosters). An output 5700 from multi point power charger system 5000 flows to antenna elements.

Figure 8:
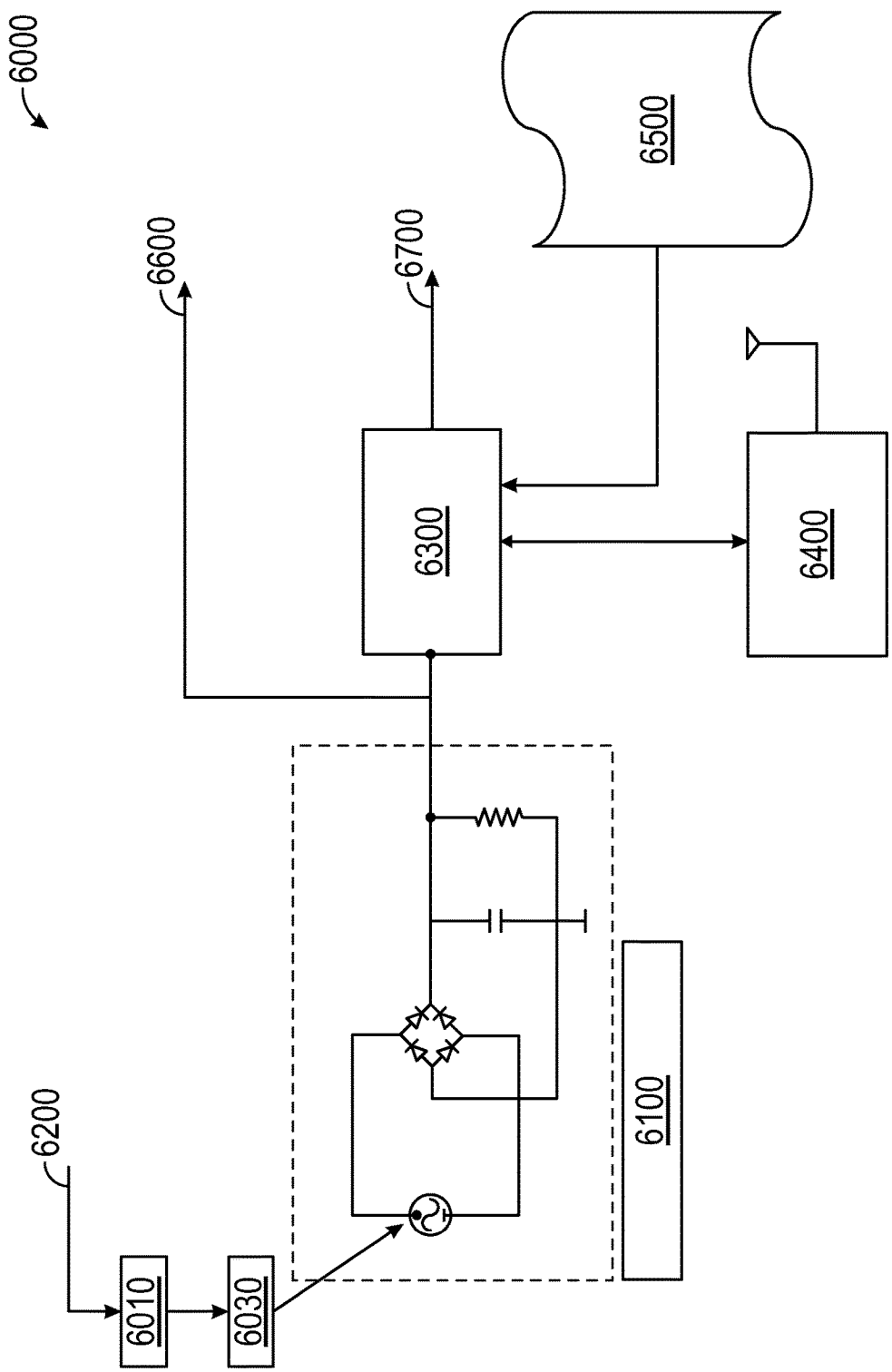
FIG. 8 is a block diagram of an exemplary embodiment of a wall mount multi point power charger system 6000.

FIG. 8 is a block diagram of an exemplary embodiment of a wall mount multi point power charger system 6000, which comprises at least an AC to DC power converter 6100 and a system controller 6300. AC to DC power converter 6100 receives electrical energy 6200, such as from a power circuit from a household wall outlet. In certain exemplary embodiments, electrical energy 6200 can be received via an energy detector 6010 and/or an energy harvester 6030, which can receive energy into multi point power charger system 6000 wirelessly. Outputs from AC to DC power converter 6100 comprise a power flow 6600 to an RF processor and an input signal to system controller 6300. System controller 6300 operates via machine instructions 6500 (e.g., a program). System controller 6300 is communicatively coupled to a WP/LAN 6400. System controller 6300 outputs a control signal 6700 to an RF and/or BB processor.

In certain exemplary embodiments, substantially untethered devices (e.g., electronic devices) determine a need for power and/or charging and requests power via an Ad Hoc WiGL network. An information device coupled to the Ad Hoc WiGL network determines locations of each of the substantially untethered devices.

The information device coupled to the Ad Hoc WiGL network determines which device needs to be charging, where it is and which wall mounted multi point power charger will be directed to perform the charging. The selected wall multi point power charger generates a directed beam pointing toward a particular untethered unit and charging starts. Untethered unit locations are constantly being determined and/or updated by information device coupled to the Ad Hoc WiGL network. Each untethered unit monitors its own charging state, its location and communicates that charging state to the information device.

Figure 9:
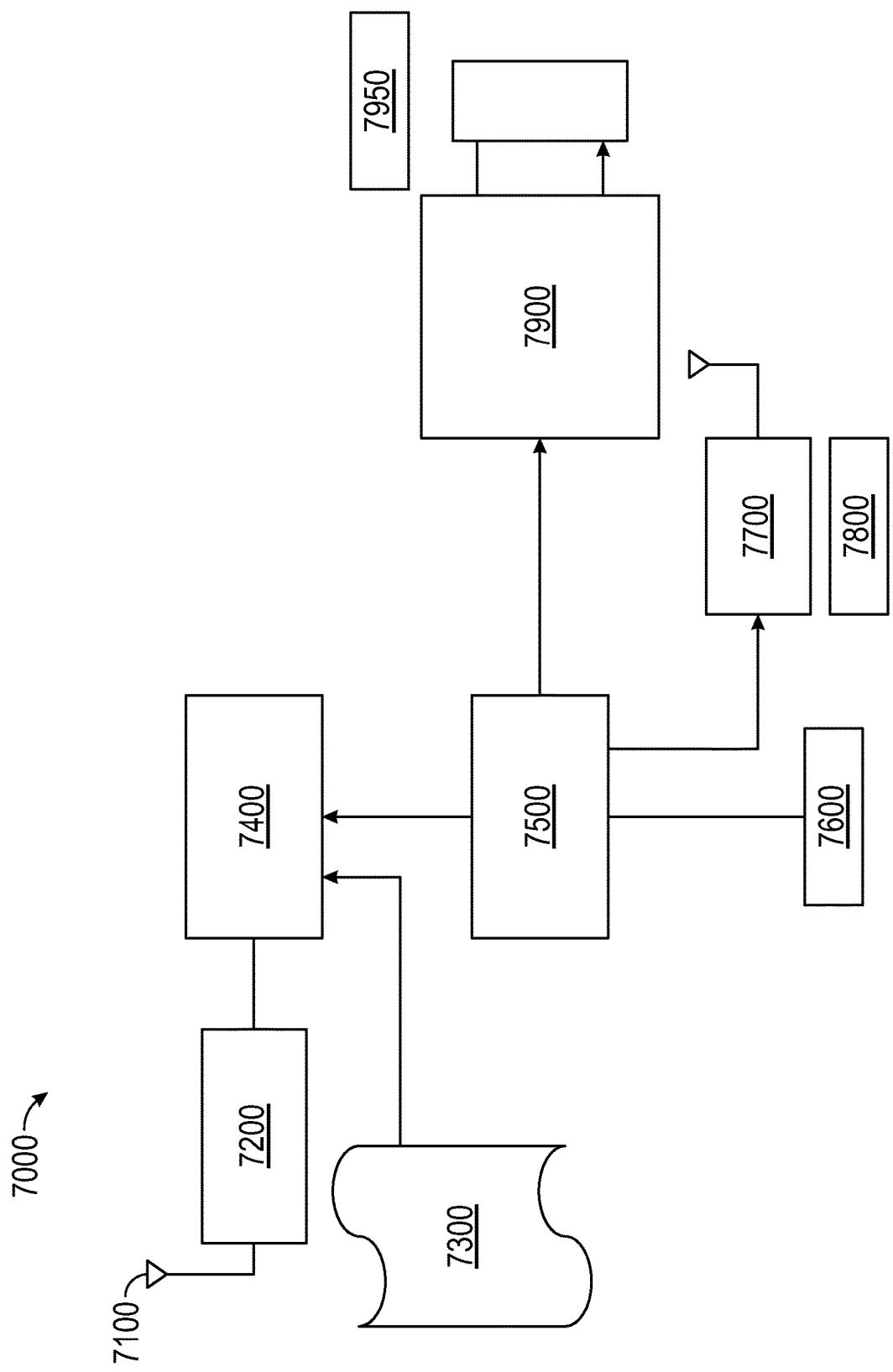
FIG. 9 is a block diagram of an exemplary embodiment of a system 7000.

FIG. 9 is a block diagram of an exemplary embodiment of a system 7000, which comprises an antenna 7100, an RF processor 7200, a baseband processor 7400, a controller 7500, an inertia measurement unit ("IMU") 7600, a baseband battery charging circuit 7900, and a battery 7950. Controller 7500 is communicatively coupled to a WP/LAN 7700. WP/LAN 7700 is communicatively coupled to a transmission channel 7800. Machine instructions 7300 are utilized by controller 7500 in processing signals that direct charging of battery 7950 via baseband battery charging circuit 7900. IMU 7600 assists in determining locations of devices communicatively coupled to controller 7500. Certain exemplary embodiments can be implemented as an Appliqué or as an integral part of the device that needs to be charged.

Figure 10:
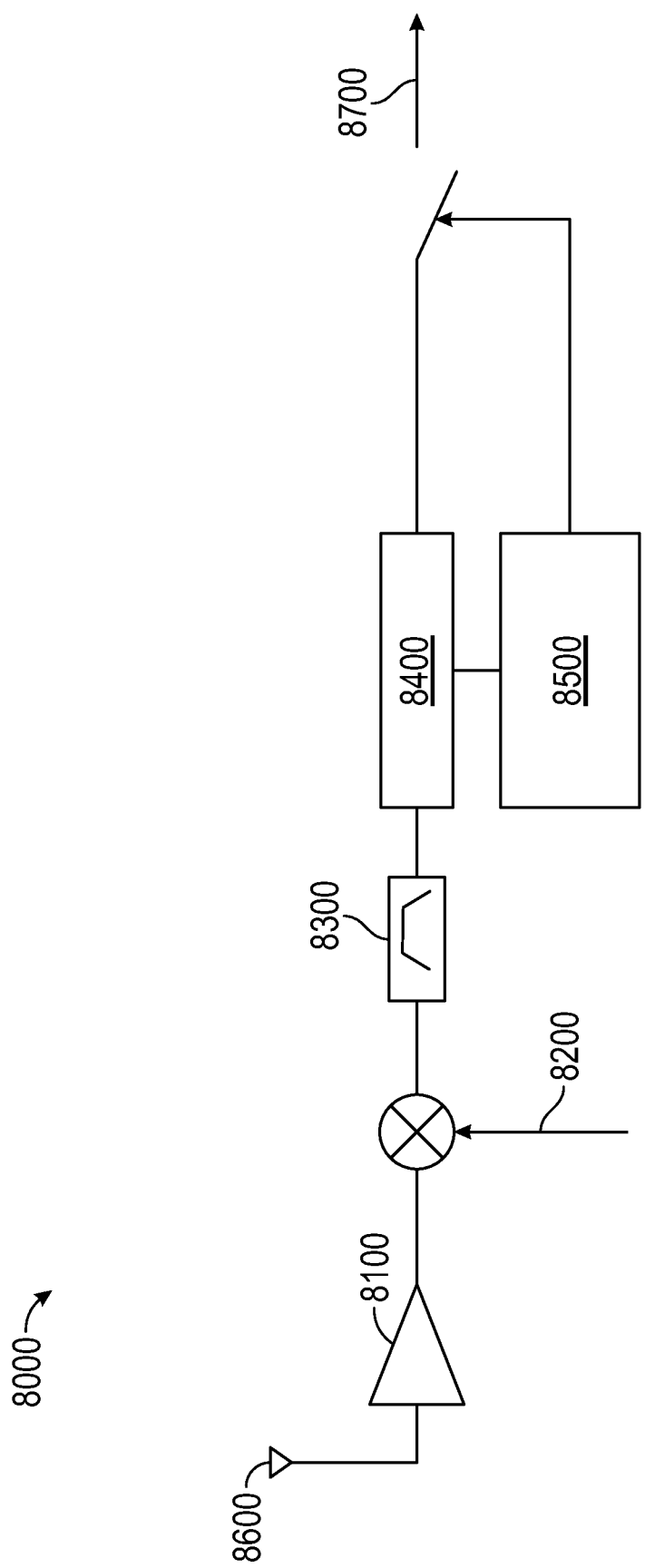
FIG. 10 is a block diagram of an exemplary embodiment of a mobile unit RF/BB processor system 8000.

FIG. 10 is a block diagram of an exemplary embodiment of a mobile unit RF/BB processor system 8000, which comprises a low noise amplifier 8100, a local oscillator 8200, a band pass filter 8300, a demodulator 8400, and a processor 8500. Processor 8500 performs an RF destination calculation and causes an RF signal 8700 to a battery charger. An omnidirectional antenna 8600 receives RF energy, demodulates and determines the destination of a directional beam. If the directional beam is assigned to charge an electronic device, the DC electrical energy is available to charge a battery of the electronic device.

Figure 11:
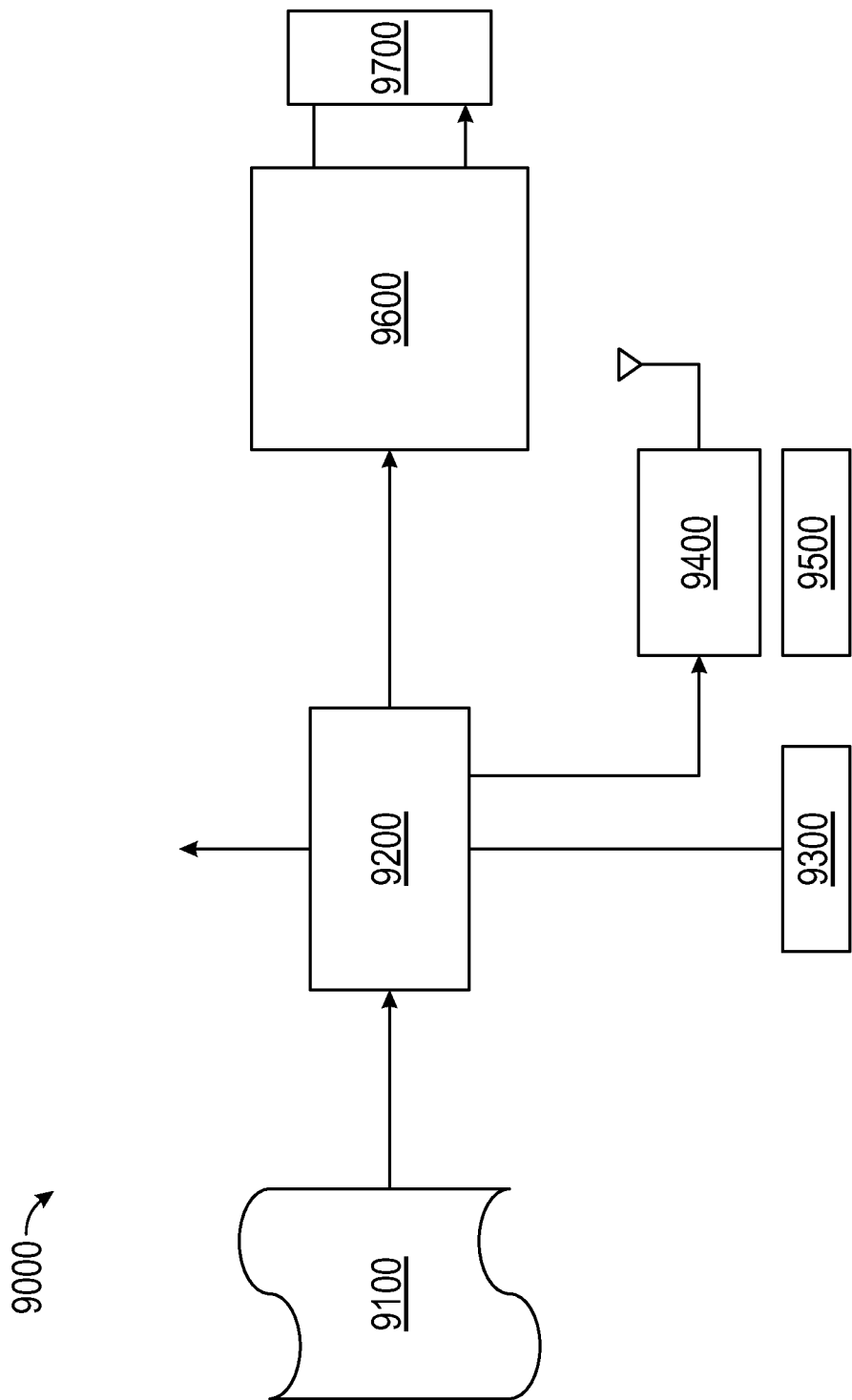
FIG. 11 is a block diagram of an exemplary embodiment of a system 9000.

FIG. 11 is a block diagram of an exemplary embodiment of a system 9000, which comprises a controller 9200, an IMU 9300, a baseband battery charging circuit 9600, and a battery 9700. Controller 9200 is communicatively coupled to a LAN 9400. LAN 9400 is communicatively coupled to a transmission channel 9500. Machine instructions 9100 are used by controller 9200 to facilitate charging of battery 9700.

Via machine instructions 9100, controller 9200 determines if an electronic device comprising battery 9700 needs charging and issues a request via LAN 9400. LAN 9400 can be an AdHoc WiGL network. IMU 9300 provides a coarse (i.e., loosely approximated) location information that is transmitted collaboratively via the AdHoc network to determine a fine (i.e., more accurately approximated) location. In some embodiments, LAN 9400 can be coupled to an Ad Hoc network. When a beam is assigned to battery 9700, the charging of battery 9700 starts.

Machine instructions 9100 determine if a unit needs charging and issues a request via the AdHoc WiGL network. IMU 9300 provides a coarse location information that is used collaboratively via signals transmitted over the AdHoc WiGL network to determine fine location information. When a beam is assigned the charging starts.

Figure 12:
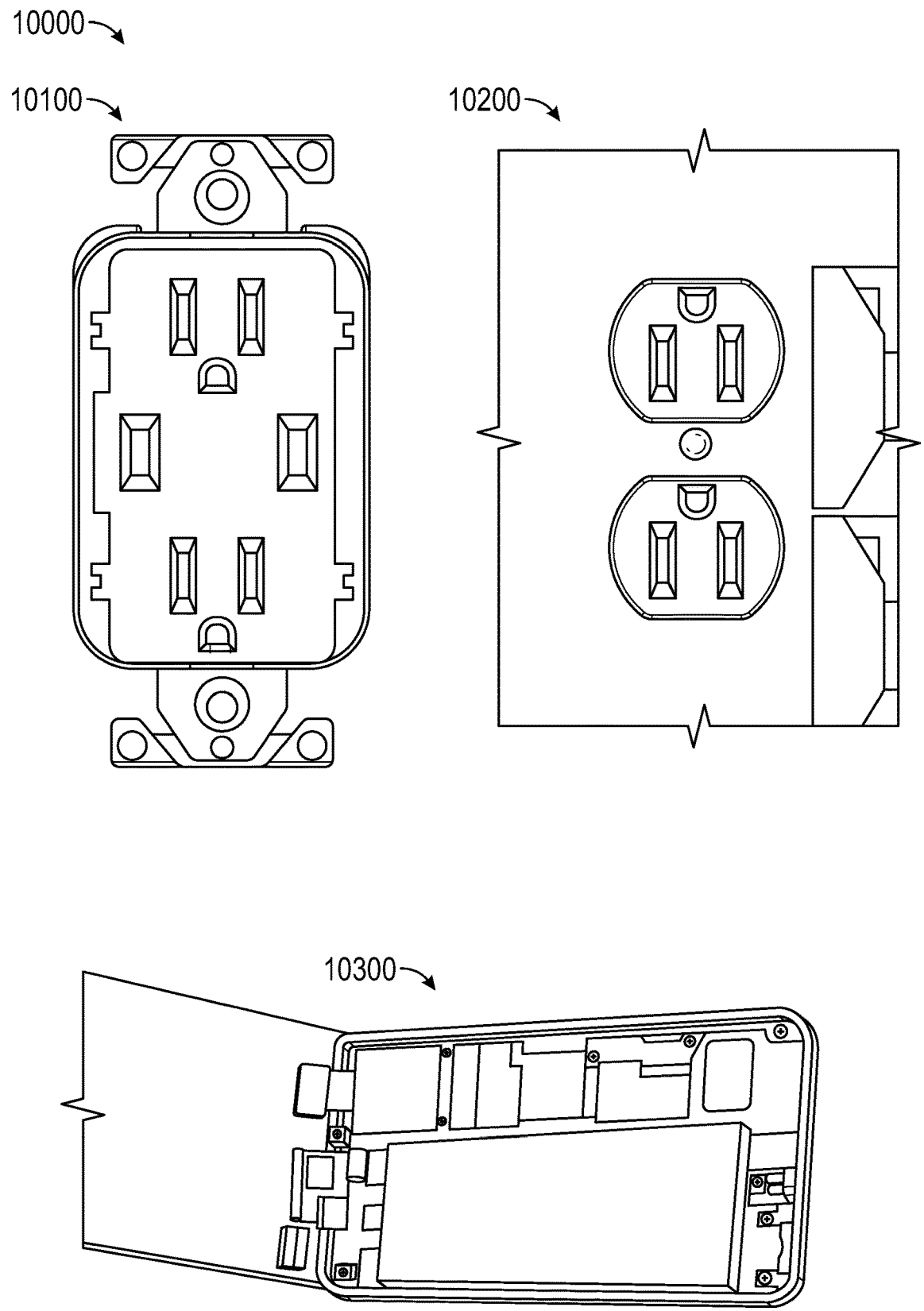
FIG. 12 comprises images 10000 of exemplary embodiments.

FIG. 12 comprises images 10000 of exemplary embodiments, which comprise an electrical receptacle 10100. A multi point power charger 10300 can be of a form to be directly coupled to electrical receptacle 10100. When so coupled, multi point power charger 10300 can cause electrical receptacle 10100 to have an appearance of installed multi point power charger 10200.

Certain exemplary embodiments provide a WiGL Packet Switching Power Network. WiGL acts as an energy delivery from a source to any energy consuming entity. WiGL entities comprise energy consuming devices such as phone, laptops, home appliances, trucks, cars, buses, motorcycles, unmanned aerial vehicles ("UAVs"), planes and satellites. Energy to be distributed by WiGL can be solar or any other form. WiGL determines what devices need how much energy and delivers energy to devices in an efficient manner. WiGL treats energy consuming entities that store energy as possible sharers of energy to other devices. WiGL uses wired and wireless media to transfer energy. WiGL wireless delivery systems can use spark; acoustic; low, high, and very high RF frequencies; and/or laser energy.

Certain exemplary embodiments detect devices that request power. In certain exemplary embodiments, WiGL requests energy from an energy source and packages energy into packets for delivery to devices. Each packet is sent to a selected device. In certain exemplary embodiments, WiGL queries devices concerning available energy to be delivered to other devices in the network. In certain exemplary embodiments, WiGL delivers power based on routing protocols in consideration of Quality of Service ("QoS") defined by a user for each entity.

Figure 13:
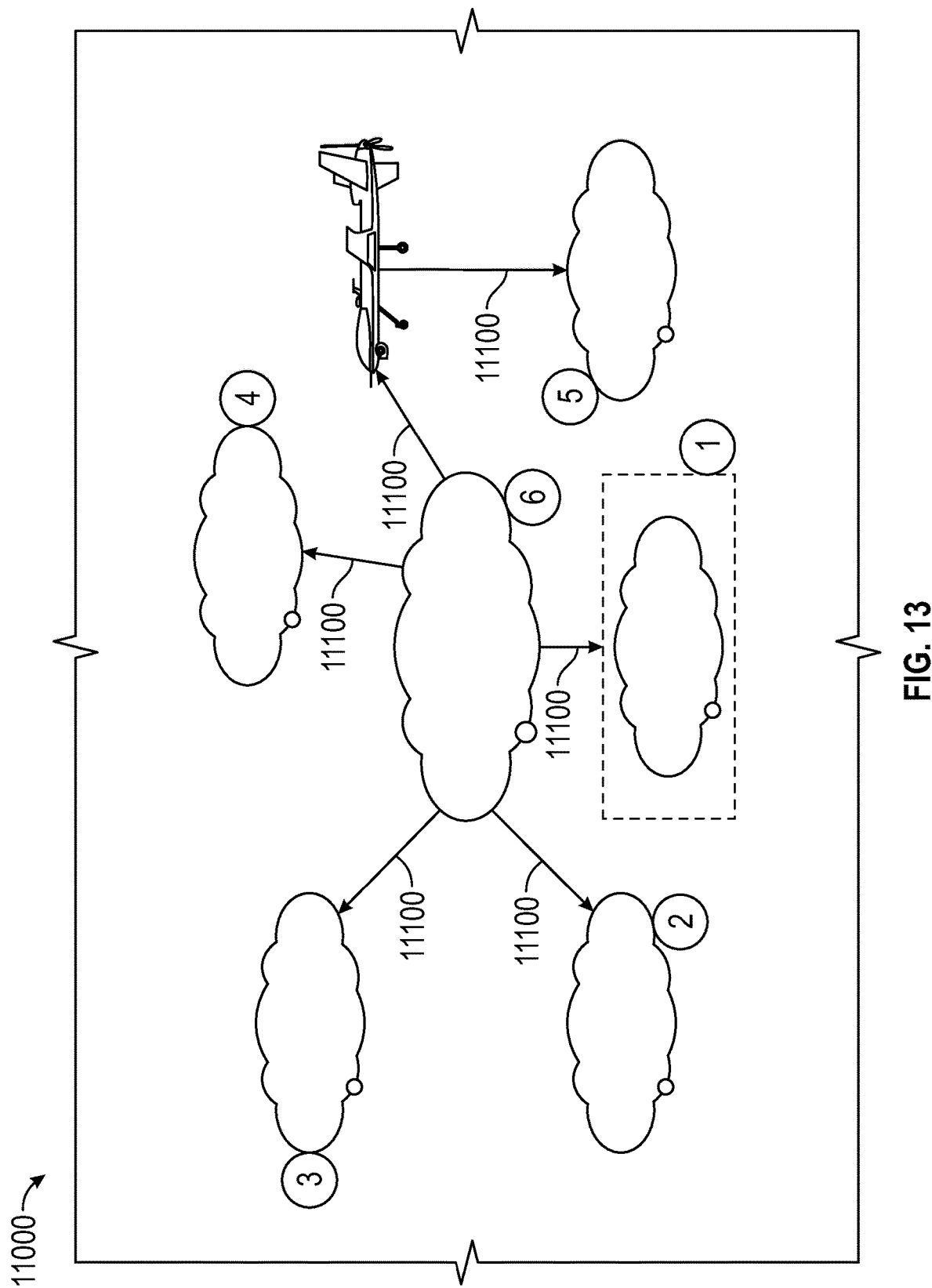
FIG. 13 is a block diagram of an exemplary embodiment of a system 11000.

FIG. 13 is a block diagram of an exemplary embodiment of a system 11000.

System 11000 is a WiGL packet switching power network. System 11000 comprises a LAN of energy consuming fixed buildings 3, a LAN of energy consuming flying objects 4, an energy source 6, LAN mobile energy consuming devices 2, LAN of indoor energy consuming devices 1, local LAN of energy consuming military devices in remote areas 5, and a plurality of WiGL multi point power chargers 11100.

Figure 14:
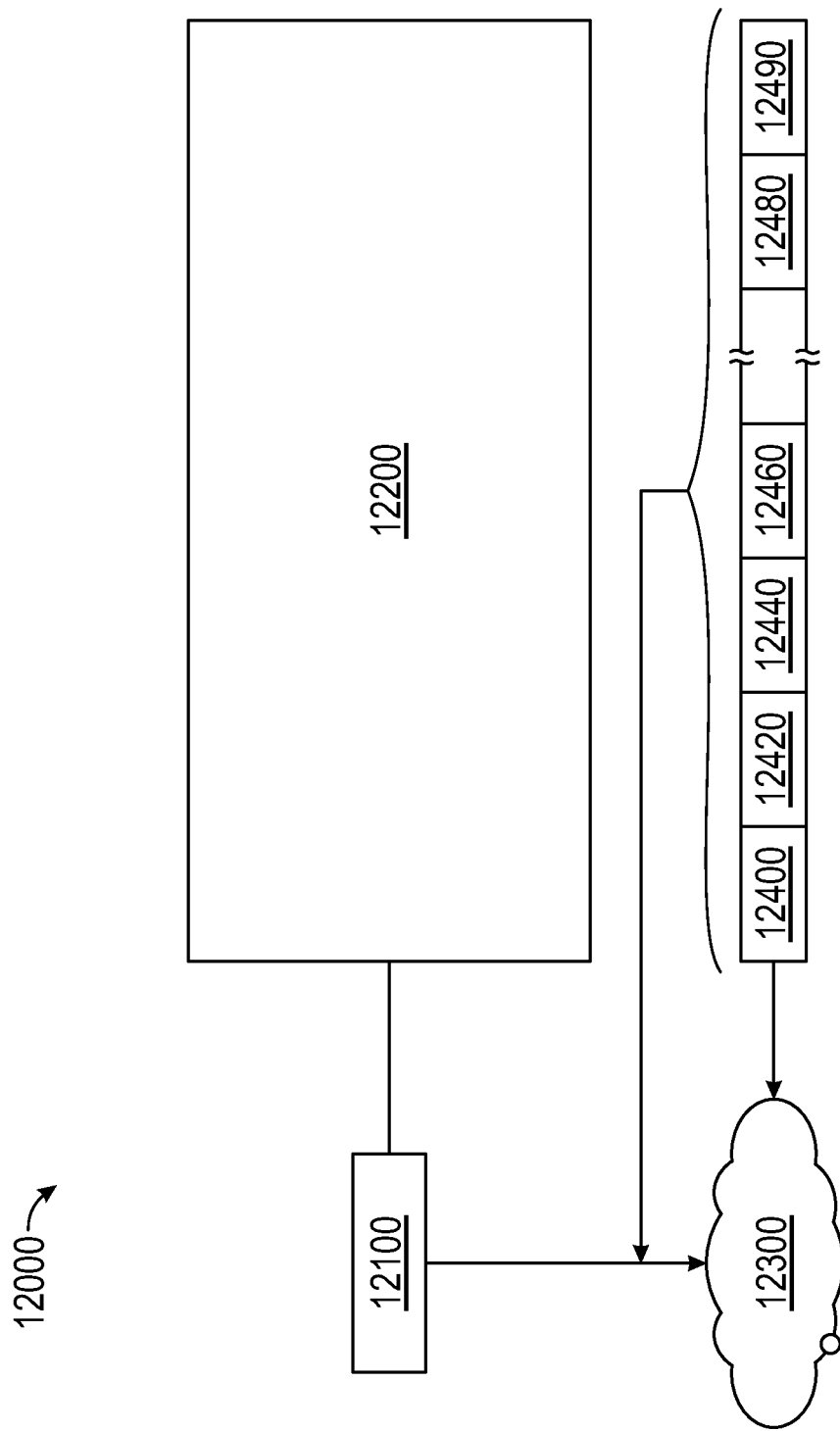
FIG. 14 is a block diagram of an exemplary embodiment of a system 12000.

FIG. 14 is a block diagram of an exemplary embodiment of a system 12000, which comprises a WiGL multi point power charger 12100, machine instructions 12200 utilizable by WiGL multi point power charger 12100, LAN of mobile energy consuming devices 12300, and set of packets 12400, 12420, 12440, 12460, 12480, and 12490. Machine instructions 12200 can direct WiGL multi point power charger 12100 to assign packets of energy to be delivered to predetermined devices. Machine instructions 12200 can direct WiGL multi point power charger 12100 to assign and route the set of packets to the predetermined devices. Machine instructions 12200 can route packets based upon a quality of service, which can be a function of urgency, how much power is needed, how often is the energy needed, and/or device local storage size, etc.

Set of packets 12400, 12420, 12440, 12460, 12480, and 12490 are delivered to LAN of mobile energy consuming devices 12300 via WiGL multi point power charger 12100 in time as a function of a routing protocols.

Exemplary WiGL processes deliver power in two modes:
Wired: From energy sources to wireless edge WiGL routers
Wireless: From point to point or point to multipoint radio frequency connections.

Exemplary WiGL devices, systems, and/or methods package power in packets with destination addresses of the devices they are meant to go to. Exemplary WiGL devices, systems, and/or methods utilize a routing protocol to optimize energy delivery. When a device and/or system desires charging, it request charging via an AdHoc network. An associated WiGL router is selected by the AdHoc network and packs the energy packets them via a technique such as time-division multiple access or frequency-division multiplexing. Energy packets are routed based on quality of service parameters defined by a user. A WiGL multi point power charger determines the location of the un-tethered unit and assigns a different beam if necessary. Radio frequency transmitted power can be dynamically adjusted based the location and/or charging requests of an untethered unit.

Figure 15:
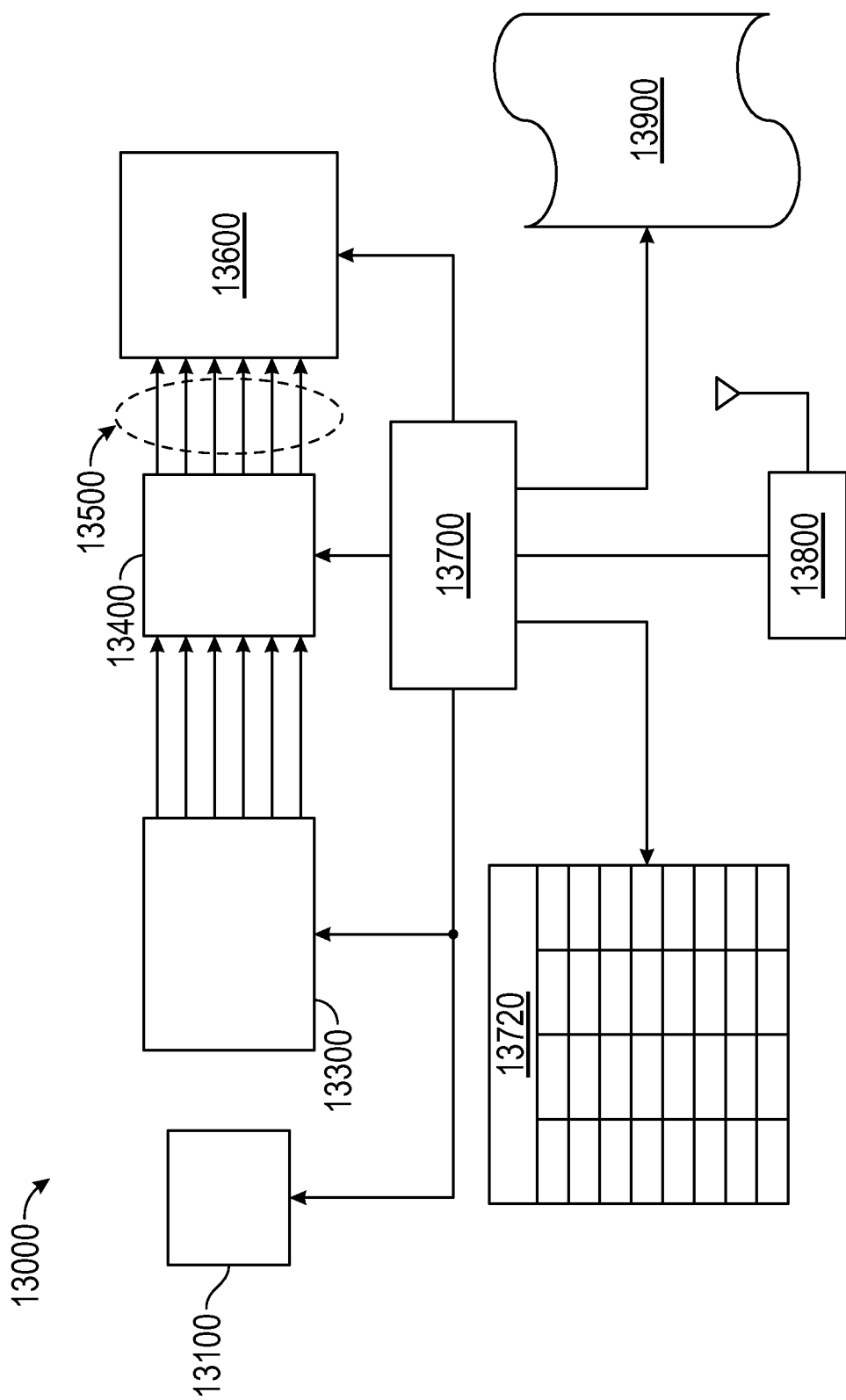
FIG. 15 is a block diagram of an exemplary embodiment of a system 13000.

FIG. 15 is a block diagram of an exemplary embodiment of a system 13000. Deliverable energy 13100 enters system 13000 and is processed via base band processor 13300 (e.g., converted to DC power). System 13000 comprises a radio frequency ("RF") processor 13400, a beam formation control 13500, a multidirectional antenna array 13600 (which can comprise an antenna—e.g., a parabolic antenna), a system controller 13700, a LAN 13800, and machine instructions 13900. System controller 13700 utilizes a WiGL routing table 13720, which can be utilized to route packets of energy to energy consuming devices via system 13000.

Figure 16:
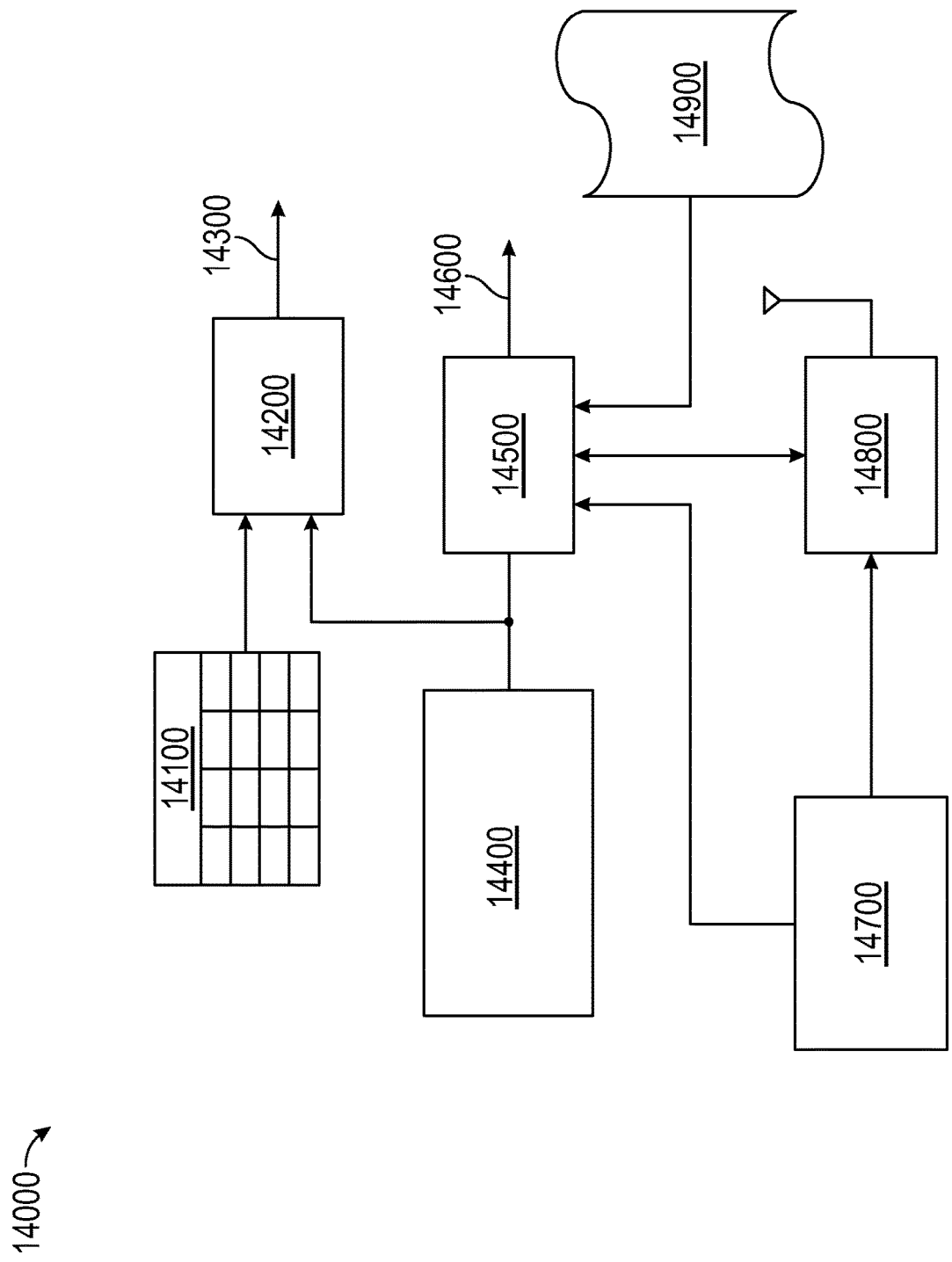
FIG. 16 is a block diagram of an exemplary embodiment of a system 14000.

FIG. 16 is a block diagram of an exemplary embodiment of a system 14000, which comprises a WiGL routing table 14100, a routing engine 14200, outgoing energy 14300 directed to a RF processor, energy to be delivered 14400, a system controller 14500, control signals 14600 routable to the RF processor and/or a base band processor, an energy saving monitor 14700, a LAN 14800, and machine instructions 14900.

Certain exemplary WiGL systems provide for substantially untethered operation. Untethered devices signal a desire for charging and signal via an Ad Hoc network to determine locations of the devices. One or more information devices coupled to the Ad Hoc network determines and assigns one or more wall mounted units and/or one or more battery-coupled units to perform the charging. The selected wall/battery unit(s) generates a directed beam pointing toward the respective untethered devices and charging starts. Untethered device locations are substantially continuously being determined by the one or more information devices coupled to the Ad Hoc network. The untethered devices monitor their respective charging states. A new charging base station can be selected should a current one become obstructed and/or unreachable.

Figure 17:
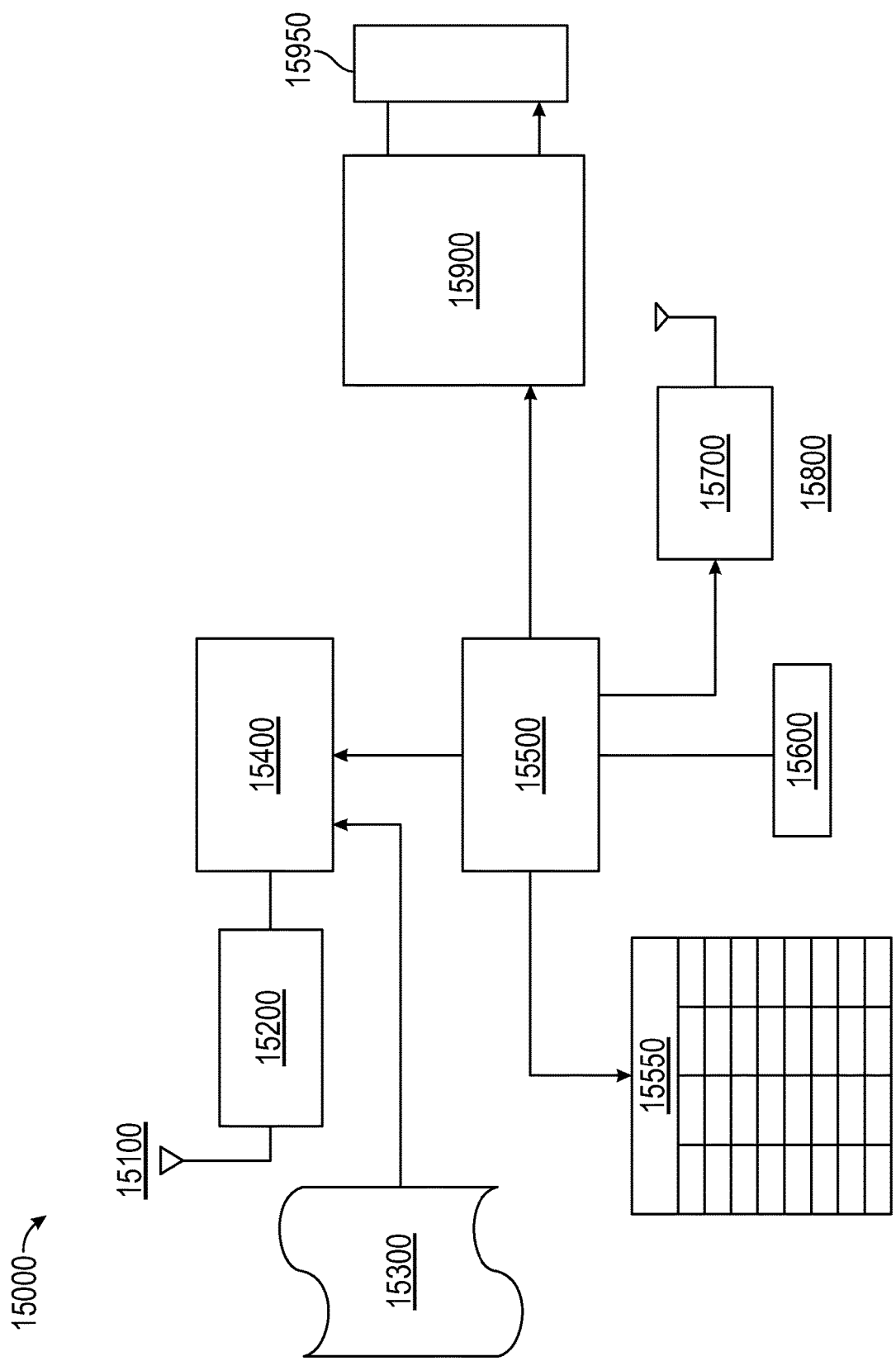
FIG. 17 is a block diagram of an exemplary embodiment of a system 15000.
Figure 18:
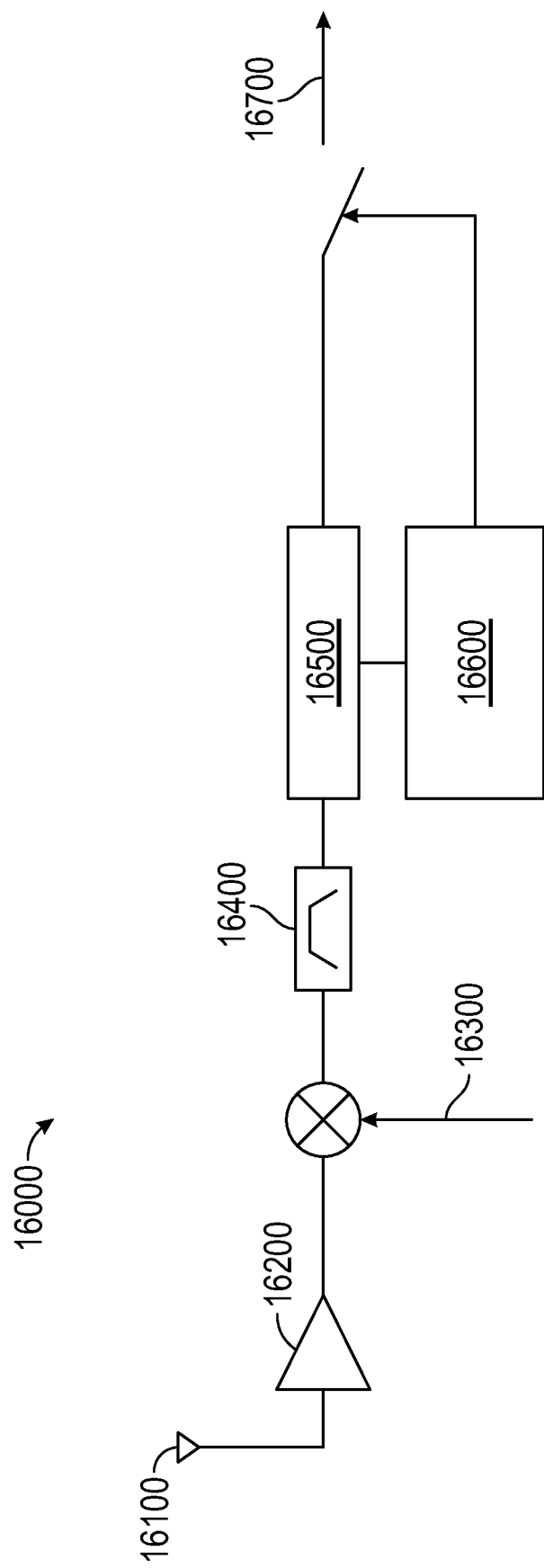
FIG. 18 is a block diagram of an exemplary embodiment of WiGL mobile unit RFs and/or base band processors 16000.

FIG. 17 is a block diagram of an exemplary embodiment of a system 15000, which comprises an antenna 15100, an RF processor 15200, a baseband processor 15400, a controller 15500, an inertia measurement unit ("IMU") 15600, a baseband battery charging circuit 15900, and a battery 15950. Controller 15500 is communicatively coupled to a WP/LAN 15700. WP/LAN 15700 is communicatively coupled to a transmission channel 15800. Machine instructions 15300 are utilized by controller 15500 in processing signals that direct charging of battery 15950 via baseband battery charging circuit 15900. IMU 15600 assists in determining locations of devices communicatively coupled to controller 15500. Controller 15500 can utilize a WiGL routing table 15550. Certain exemplary embodiments can be implemented as a machine instruction application or as an integral part of the device that needs to be charged FIG. 18 is a block diagram of an exemplary embodiment of WiGL mobile unit RFs and/or base band processors 16000, which comprises antennae 16100, a low noise amplifier 16200, a local oscillator 16300, a band pass filter 16400, a demodulator 16500, and an RF destination calculation device 16600. Energy 16700 is routable to a battery charger and/or other energy consuming device and/or system. An omnidirectional antenna receives RF energy, demodulates and determines the destination of a beam. If the beam is assigned to provide energy to a device and/or system, energy (e.g., DC electrical energy is made available to charge one or more batteries).

Figure 19:
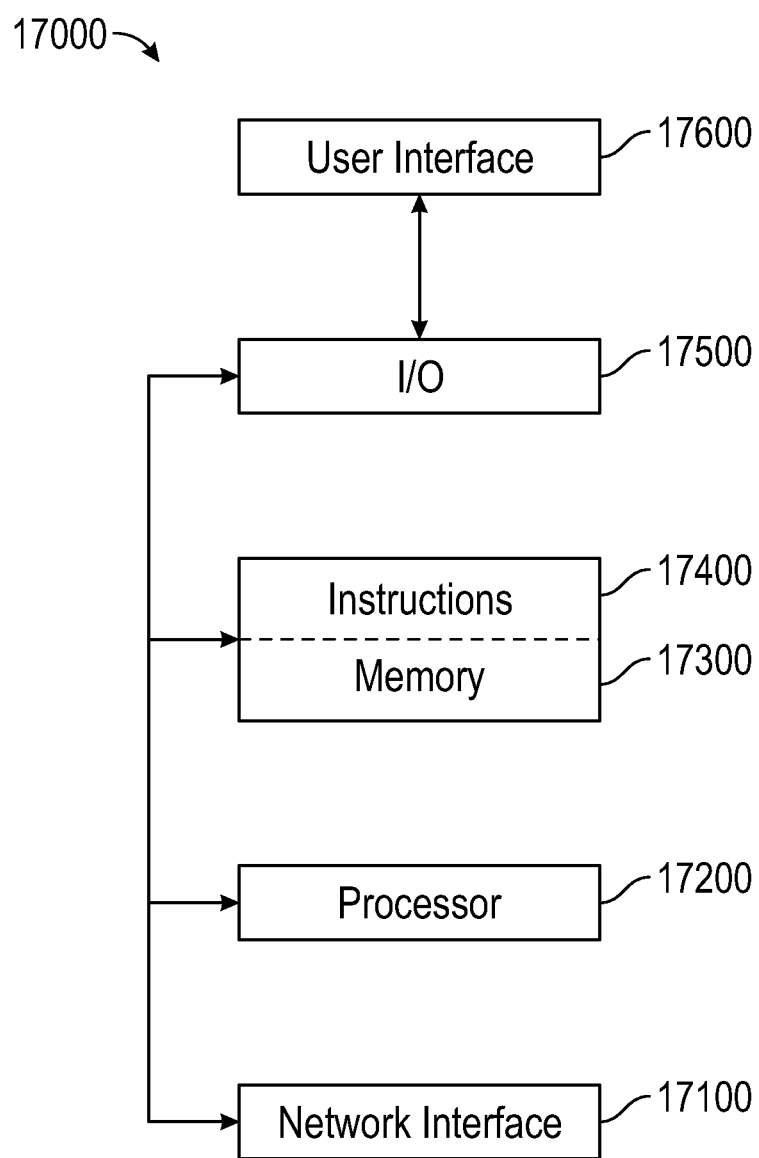
FIG. 19 is a block diagram of an exemplary embodiment of an information device 17000.

FIG. 19 is a block diagram of an exemplary embodiment of an information device 17000, which in certain operative embodiments can comprise, for example, the controller shown on page 6 of FIG. 1. Information device 17000 can comprise any of numerous circuits and/or components, such as for example, one or more network interfaces 17100, one or more processors 17200, one or more memories 17300 containing instructions 17400, one or more input/output (I/O) devices 17500, and/or one or more user interfaces 17600 coupled to one or more input/output (I/O) devices 17500, etc.

In certain exemplary embodiments, via one or more user interfaces 17600, such as a graphical user interface, a user can view a rendering of information related to charging and/or energizing devices via a charge controller. The user can also disable the charging and/or set the charging at certain times or power levels.

Figure 22:
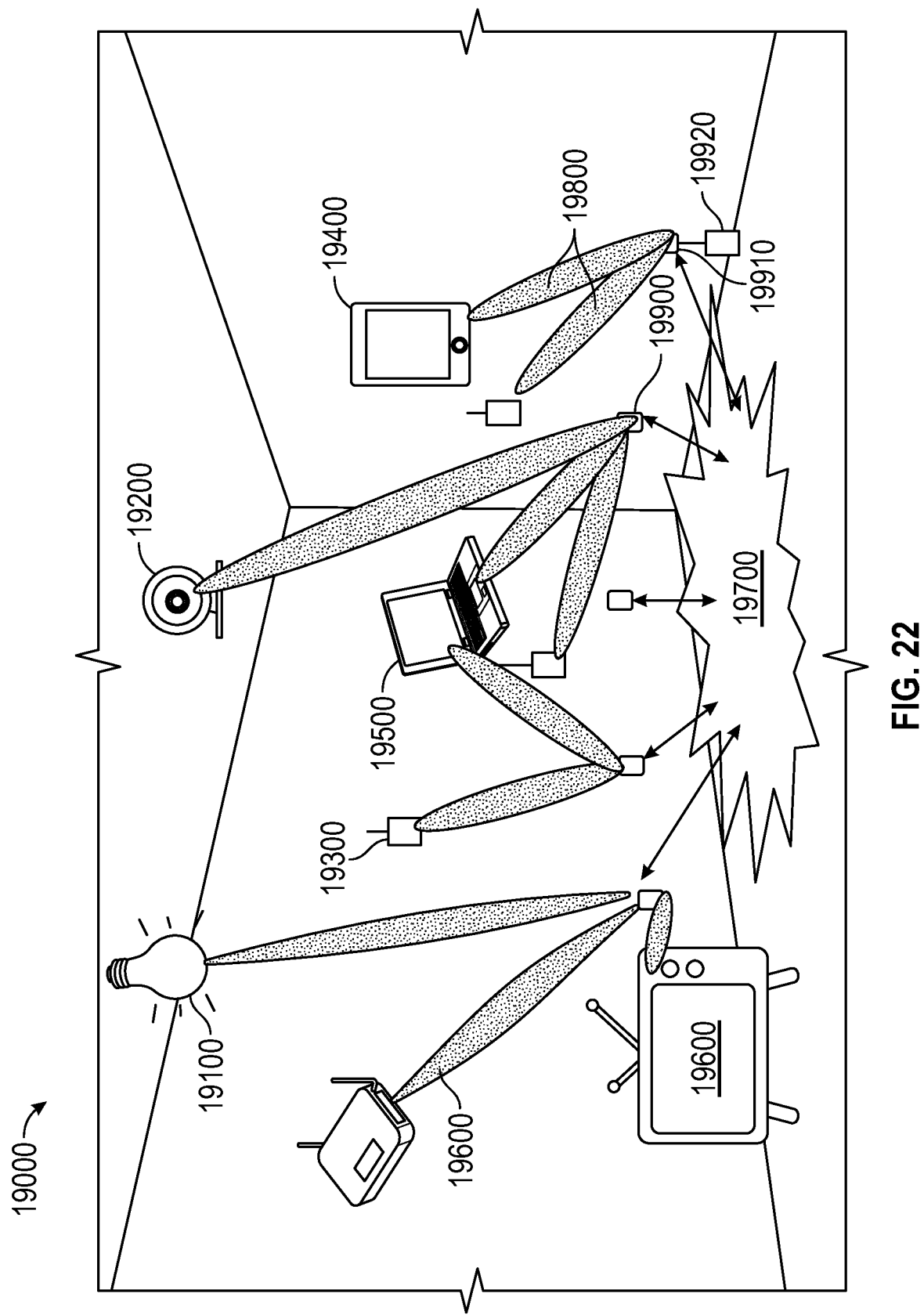
FIG. 22 is a block diagram of an exemplary embodiment of a system 19000.

FIG. 22 is a block diagram of an exemplary embodiment of a system 19000, which comprises a light fixture 19100, home security devices 19200, low power untethered devices 19300, hand held devices 19400, high power untethered devices 19500, TV/home gateways 19600, and/or a local area network 19700 (e.g., an AdHoc LAN). System 19000 is illustrative of wireless transmissions of directional energy beams 19800 transmitted and received by electronic devices. One or more information device communicatively coupled to local area network 19700 can direct and/or redirect one or more of directional energy beams 19800. The system may include one or more wall mounted wireless chargers 19900 and/or one or more auxiliary powered wireless chargers 19910 coupled to a respective auxiliary power source 19920, which can be a battery, fuel cell, solar source, or the like.

FIG. 23 is a block diagram of an exemplary embodiment of a system 20000, which comprises a satellite transmitter/receiver 20100, a light fixture WiGL transmitter 20200, first responders 20300, passenger or autonomous vehicles 20400, airborne untethered devices 20500, handheld devices 20600, WiGL transmitters embedded in the earth 20700, and/or AC/DC as LAN 20800. System 20000 is illustrative of wireless transmissions of directional energy beams 20900 transmitted and received by electronic devices. One or more information device communicatively coupled to a LAN comprised by system 20000 can direct and/or redirect one or more of directional energy beams 20900.

Figure 20:
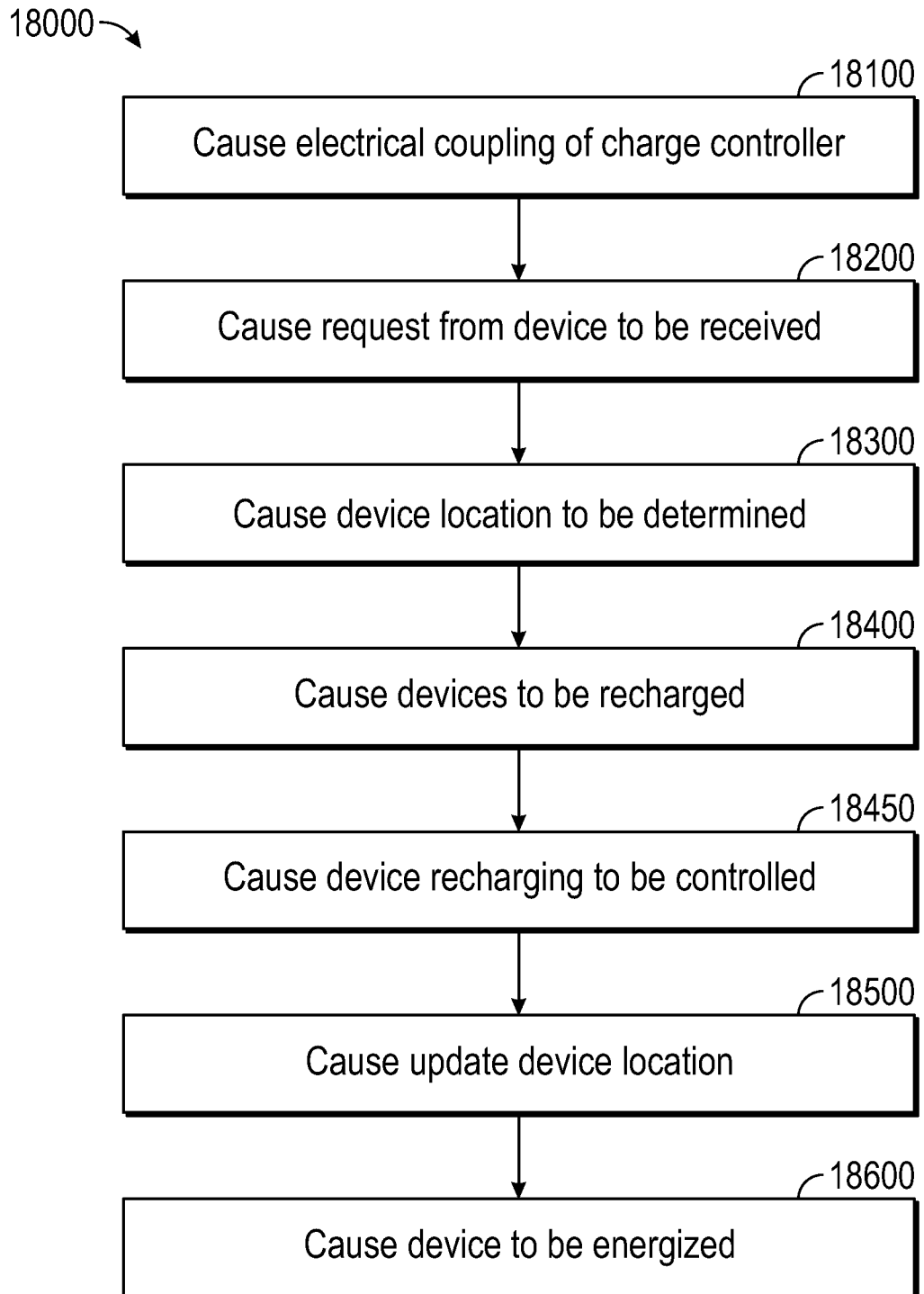
FIG. 20 is a flowchart of an exemplary embodiment of a method 18000.

FIG. 20 is a flowchart of an exemplary embodiment of a method 18000. At activity 18100, certain exemplary embodiments can cause a coupling of a charge controller to an electrical energy source (e.g., an electrical outlet, etc.). At activity 18200, certain exemplary embodiments can cause a request from a device to be received (e.g., a request to recharge a partially or nearly fully depleted battery). At activity 18300, certain exemplary embodiments can cause an electronic device to be located.

At activity 18400, certain exemplary embodiments can cause the electronic device to be charged via the charge controller. Certain exemplary embodiments comprise causing an electronic device to charge via a multi point power charger of a plurality of multi point power chargers. Certain exemplary embodiments comprise receiving a request to charge the electronic device. The multi point power charger is coupleable to the electrical energy source. The multi point power charger is constructed to direct a beam of electrical energy toward the electronic device such as to wirelessly charge and/or wirelessly power the electronic device. The multi point power charger can be selected from the plurality of multi point power chargers responsive to a first determination of a location of the electronic device and a second determination that a charging request has been received the electronic device. The beam of electrical energy is routed and/or directed responsive to the determination of the location of the electronic device. The electronic device can be coupled to a local area network and the multi point power charger can also be coupled to the local area network. The local area network can comprise and/or be coupled to the electrical energy source. Radio frequency charging power can be dynamically controlled to provide low radiant power losses in the vicinity of devices to be charged. A charging element can selected based on an optimum power delivered to the electronic device to based at least one of:

a type or status of power connected to the charger;
a requested speed of charging;
request voltage or current;
request a type of transmission or receiver energy (e.g. RF, DC, AC, piezoelectricity, and/or nanocrystal) based on a WiGL routing policy and/or table; and/or
a level of charge of a battery comprised by the electronic device.

At activity 18450, certain exemplary embodiments cause device recharging to be controlled via the charge controller. At activity 18500, certain exemplary embodiments cause the location of the electronic device to be automatically updated. Certain exemplary embodiments cause redirection of one of the plurality of directional beams toward the updated location of the electronic device. Certain exemplary embodiments provide a plurality of wireless electrical power electromagnetic radiation (e.g. radio frequency) transmissions into a general location. In certain exemplary embodiments, the electronic device is charged is in range within which the multi point power charger can cause a wireless powering, self-charge or recharge. In certain exemplary embodiments, a charging element is selected based on an optimum power delivered to the electronic device to based on at least one of:

a type or status of power connected to the charger;
requested speed of charging; and/or
a level of charge of a battery comprised by the electronic device.

At activity 18600, certain exemplary embodiments cause electrical devices to be energized via the charge controller.

Figure 21:
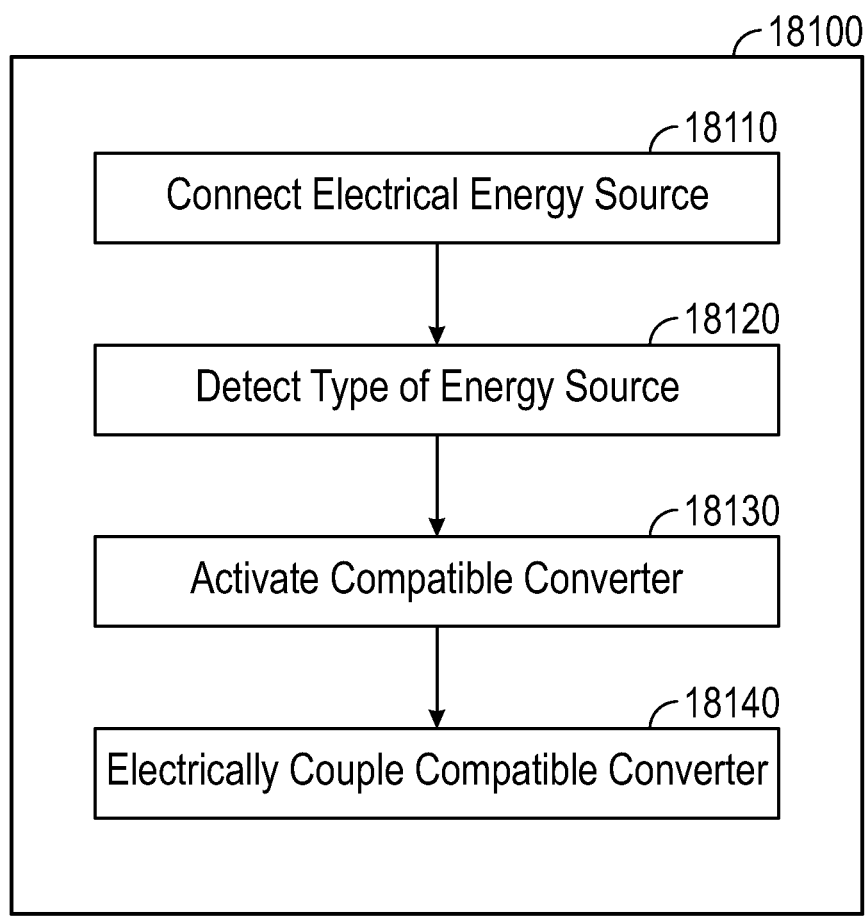
FIG. 21 is a flowchart of an exemplary embodiment of activity 18100 in FIG. 20.

FIG. 21 is a flowchart of an exemplary embodiment of activity 18100 in FIG. 20 to cause the electrical coupling of the charge controller. At activity 18110, certain exemplary embodiments can cause a connection of the electrical energy source, which can be, for example, a battery such as a saltwater battery or magnesium air battery, a fuel cell, a solar source, or the like. At activity 18120, certain exemplary embodiments can cause the type of energy source to be detected, e.g., by determining a voltage of the energy source. Then, at activity 18130, certain exemplary embodiments can cause the activation of the appropriate converter of a plurality of converters, to provide the desired conversion to the output voltage required by the wireless charger. Finally, at activity 18140, certain exemplary embodiments cause electrical coupling of the activated converter with the charge controller.

Figure 24:
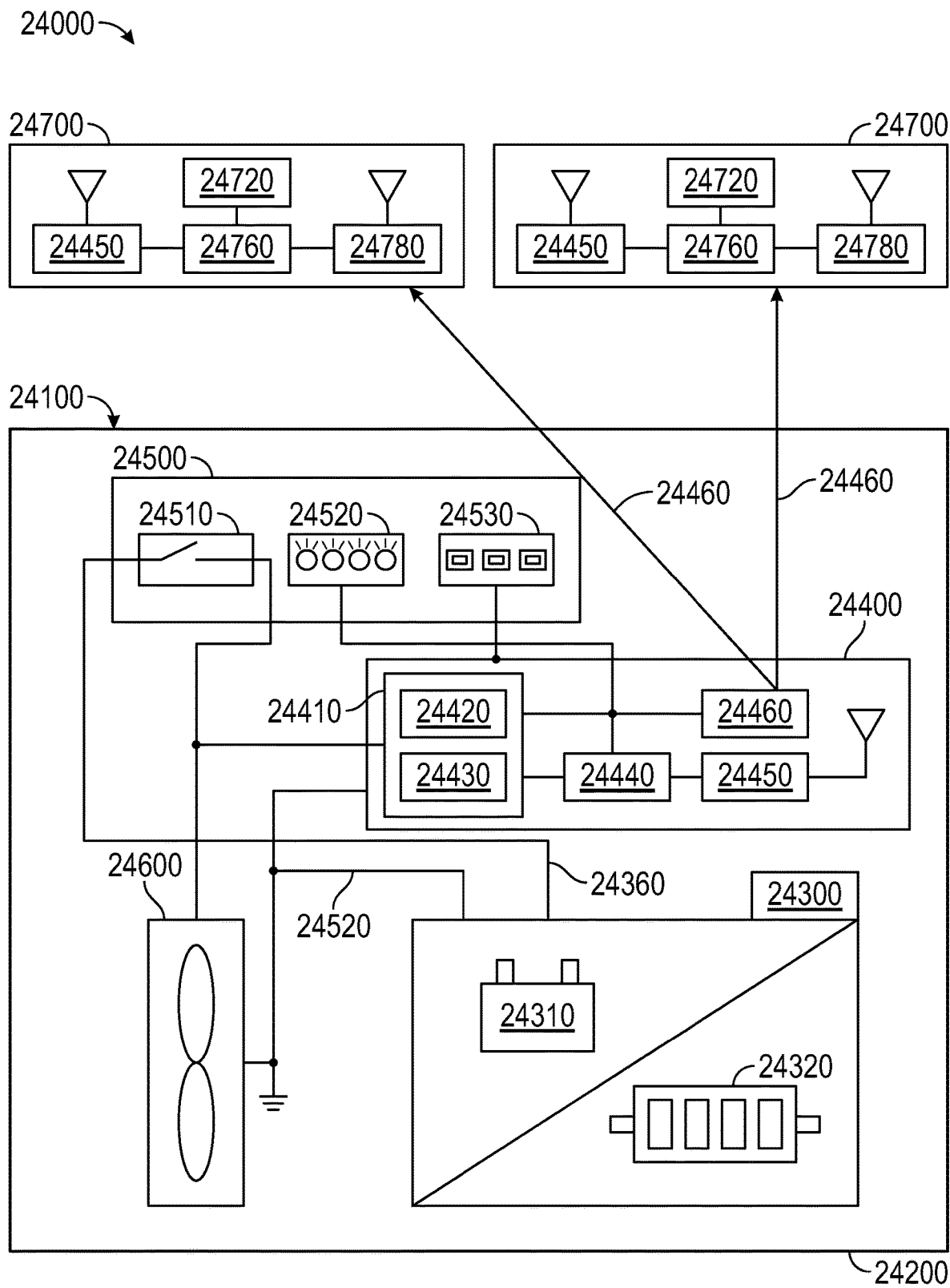
FIG. 24 is a block diagram of an exemplary embodiment of a portable charging system 24000.

FIG. 24 shows an exemplary embodiment of a charging system 24000 comprised of a preferably self-contained, portable unit 24100. The portable unit has a housing indicated schematically at 24200, which contains a power source 24300, a multi point power charger 24400, and a panel display 24500. One or more fans 24600 can also be provided in the unit 24100 to provide any cooling needed by the power source 24300 and/or the charger 24400. The unit may be configured to receive a plurality of different types of power sources 24300, preferably at least a battery 24310 and a fuel cell 24320, by having a converter unit 24410 in the charger 24400, with a first converter 24420 that is activated when the battery is installed, and a second converter 24430 when the fuel cell is connected. In general, the housing may be opened to receive the power source 24300 and the lead wire 24310 and ground wire 24320 are connected.

The charger 24400 has a controller 24440 that detects which type of power source is connected, e.g., by sensing for a voltage characteristic of the type of power source that is connected. The controller then activates the appropriate converter 24420 or 24430 for that power source. As one example, the battery 24310 can be a magnesium air battery with replaceable magnesium anode and replaceable saltwater electrolyte comprised of 2-5% NaCl that outputs a nominal voltage of 24 volts. As another example, the fuel cell 24320 can be a hydrogen fuel cell that outputs a nominal voltage of 24.5 volts. The converters 24420, 24430 each output a voltage appropriate for the charger 24400, e.g., 5 volts.

Charger 24400 is communicatively coupled to a WiGL network 24450 and is constructed to transmit multi-directional beams 24460 via multidirectional antenna 24465. Mobile units 24700 comprise a battery charger 24720, a controller 24760, and a receiver 24780. Mobile units are communicatively coupled to WiGL network 24450. Mobile units 24700 comprise a battery charger 24720, a controller 24760, and a receiver 24780. Mobile units 24700 consume energy.

The multi point power charger 24400 is augmented by a controller 24440. The system provides RF beam forming capabilities, which RF beams are formed and directed via communications transmitted via a formed Ad Hoc WiGL network 24450. This AdHoc WiGL network may be created by software (code, application or other methods as outlined in the Institute of Electrical and Electronics Engineers (IEEE) standard 802.11) to determine the size, scope and needs of the WP/LAN. When an untethered device (e.g., an electronic device such as 24700) needs charging, it requests charging via a signal transmitted via the Ad Hoc WiGL network 24450. The multi point power charger 24400 causes generation of a directed beam that may be a radio frequency ("RF") beam. The information device determines the location of the untethered device and assigns a different beam if necessary. RF transmitted power is dynamically adjusted based on the location and charging needs of the untethered device.

The unit 24100 may include a panel 24500 having a power switch 24510, status indicator lights 24520, and USB charging ports 24530. The power switch 24510 is used to connect the power source to the charger 24400, fan 24600 and panel 24500, and will normally be switched to the off position for changing out or servicing the power source 24300.

Status lights 24520 can indicate the status of the battery 24310 and/or fuel cell 24320. For example, the status lights can include, when the battery 24310 is connected, a full power indicator, a half power indicator, a low power indicator, an anode replacement indicator, and a saltwater replacement indicator, and so on; and when the fuel cell 24320 is connected, a full fuel indicator, a half fuel indicator, a low fuel indicator, a fuel cell malfunction indicator, and so on.

USB connection ports 24530 can be controlled by the charger 24400 in a manner analogous to the beams 24460 to provide a wired charge to a tethered device (not shown).

Figure 25:
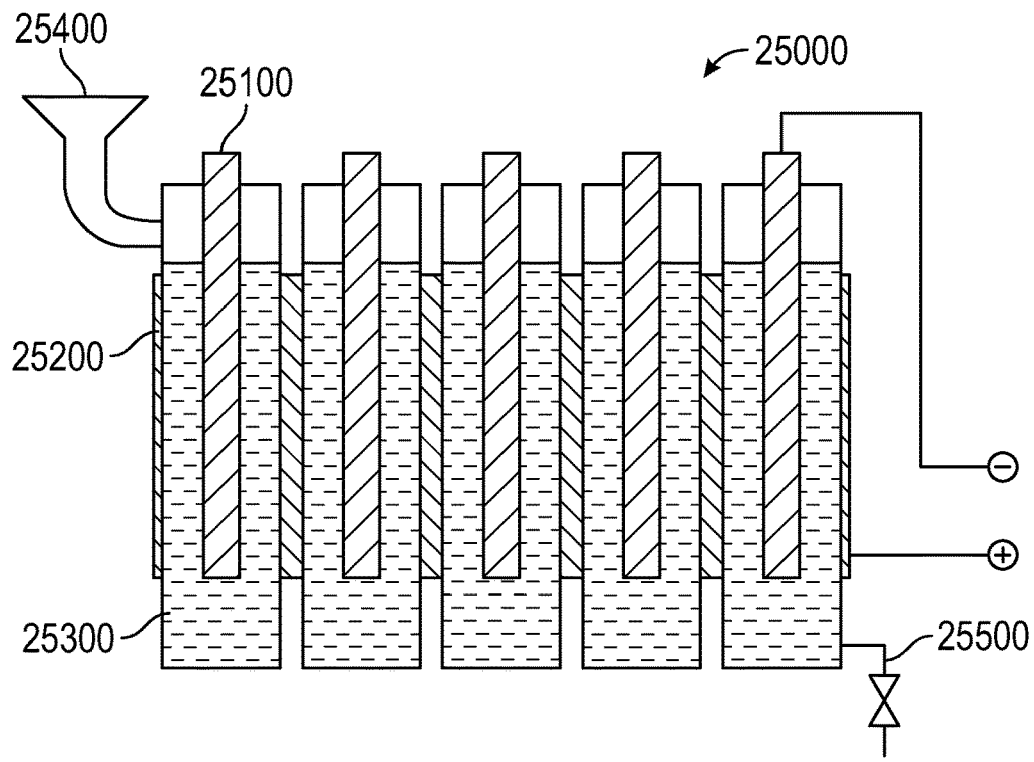
FIG. 25 is a schematic diagram of an exemplary embodiment of a magnesium air battery 25000.

FIG. 25 is a schematic diagram of an exemplary embodiment of a magnesium air battery 25000. The battery has replaceable magnesium anode plates 25100 spaced between cathodes 25200 and is filled with saltwater electrolyte 25300. The battery 25000 also has a fill port 25400 for adding fresh electrolyte and a drain 25500 for removing spent electrolyte. The battery can be transported without the electrolyte 25300, making it lighter, and the electrolyte can be added prior to use. Further, the electrolyte can be prepared by adding salt (NaCl) to fresh water, e.g., using a premeasured packet of salt to be added to a specified volume of fresh water, or if available, seawater may be used as the electrolyte.

Figure 26:
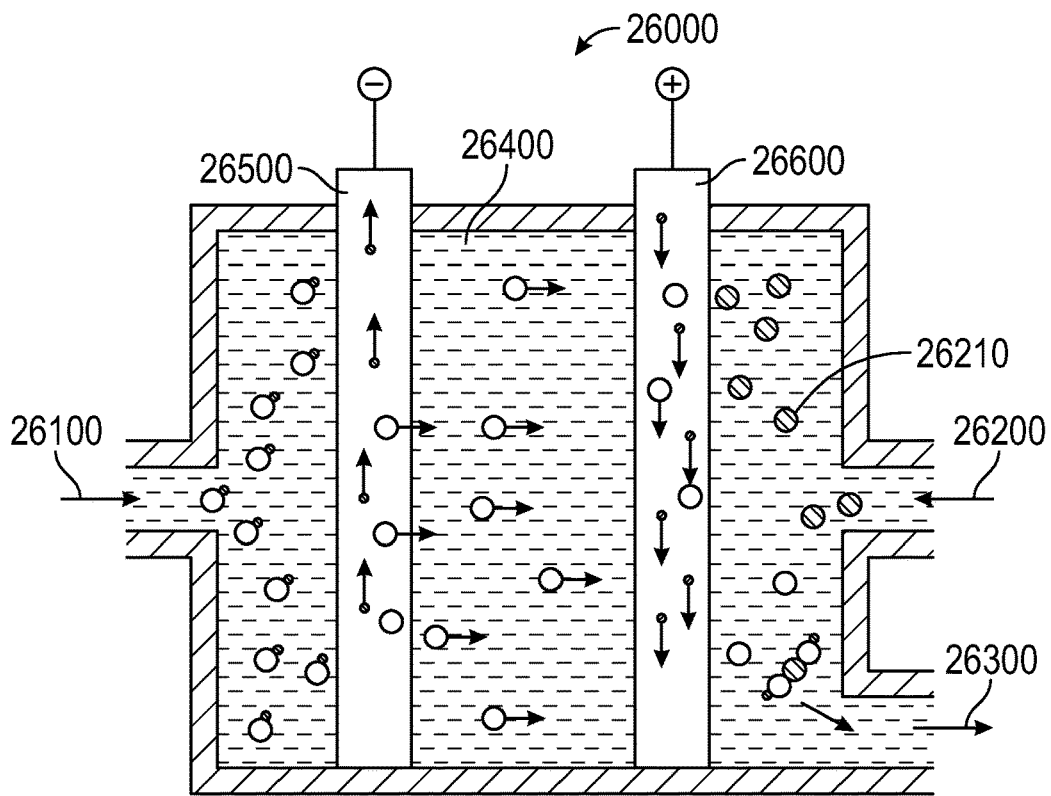
FIG. 26 is a schematic diagram of an exemplary embodiment of a fuel cell 26000.

FIG. 26 is a schematic diagram of an exemplary fuel cell 26000. The fuel cell has a fuel entry port 26100 for a suitable fuel such as hydrogen (e.g., SAE J2719 or better), an oxidant entry port 26200, and reaction product exhaust port 26300. An electrolyte 26400 separates the anode 26500 from the cathode 26600. In operation, oxygen 26210 flows to the cathode 26600 where it reacts with fuel ions from the electrolyte 26400.2400

Certain exemplary embodiments cause routing tables, policies, methods, models, flow of wireless electrical grid LAN usage to be created, published and/or used. Certain exemplary embodiments provide certifications of or related to the usage, maintenance, repair, and diagnosis of wireless electrical grid LAN usage. Certain exemplary embodiments provide educational models or courses related to or credited with educating students, theorists, practitioners or laymen in wireless electrical grid LAN usage. Certain exemplary embodiments provide published papers or articles, be they online or in print of or related to wireless electrical grid LAN usage.

Certain exemplary embodiments provide for substantially wireless recharging of electronic devices. Certain exemplary embodiments provide for recharging of electronic devices substantially without cords and/or outlets that are directly coupled to an electrical grid. Certain exemplary embodiments provide for wireless recharging of electronic devices via a wireless charging system available via a network in a form of WiGL.

Certain exemplary embodiments utilize an existing infrastructure via an alternating current or direct current power source. Certain exemplary embodiments utilize an existing infrastructure via universal serial bus ("USB") ports and/or recharger ports, etc. of electronic devices. In certain exemplary embodiments, WiGL systems are coupled to a power source such as via plugging into an electrical outlet. In certain exemplary embodiments, WiGL systems are wirelessly coupled to electronic devices via an interface plugged into one or more USB ports of the electronic devices.

Certain exemplary embodiments utilize a mobile power source such as a battery, fuel cell, solar source, or the like, preferably a portable battery, fuel cell, or solar source. Certain exemplary embodiments use a saltwater battery, preferably a magnesium air battery, which preferably can be refueled by replacing the saltwater and/or the magnesium anode.

Certain exemplary embodiments can utilize an antenna having a suitable gain ("dBi") (e.g., a 24 dBi parabolic antenna). The multi point power charger can comprise a parabolic antenna. The multi point power charger can comprise a parabolic antenna. Certain exemplary embodiments can utilize components made by companies such as RF Diagnostics, LLC detect and/or harvest energy (e.g., one or more model number RFD102A-DET microwave energy detectors and/or one or more model number RFD102A-A microwave energy harvesting modules). Certain exemplary embodiments transmit energy at a predetermined power output and frequency (e.g., approximately 0.5 watts at approximately 2.4 gigahertz). The multi point power charger can comprise an energy detector. Certain exemplary embodiments can light up to a predetermined count of detectors (e.g., eight or more detectors) at predetermined distances (e.g., distances of greater than approximately three feet and/or up to over 100 feet for transmission and/or reception). The multi point power charger can be constructed to charge the electronic device with the electronic device at a distance of over 100 feet from the multi point power charger. Certain exemplary embodiments can provide a predetermined charge current at a predetermined voltage (e.g., approximately five milliamps at approximately 1.4 volts). Certain exemplary embodiments can provide an energy efficiency for charging (e.g., greater than approximately 15% efficiency). Certain exemplary embodiments can use or cause WiGL to use communications access technologies to multiplex smart energy such as, frequency division multiple access (FDMA); time division multiple access (TDMA); code division multiple access (CDMA); orthogonal frequency division multiple access (OFDMA); and/or spatial division multiple access (SDMA), etc. Certain exemplary embodiments provide for battery-to-battery WiGL capability (e.g., direct current to direct current charging) such as in vehicle and/or airplanes, etc. The multi point power charger can provide direct current to direct current charging.

Certain exemplary embodiments provide wireless charging capabilities in systems comprising hardware, software and/or firmware constructed to implement methods of exemplary embodiments. Certain exemplary embodiments can utilize one or more of apps, cards, radios and/or board technologies.

Certain exemplary embodiments can provide laser or directed energy based WiGL, which can utilize substantially any energy source frequency on the sound or light spectrums.

Certain exemplary embodiments can utilize a substantially single beam of WiGL.

Certain exemplary embodiments can utilize long haul transmissions, relays, and/or power boosting. The multi point power charger can obtain electrical energy from a long haul transmission line. A power booster can be utilized to expand a range of the multi point power charger. Certain exemplary embodiments can utilize cell towers and/or other tower technologies constructed to implement Wi-GL devices, systems, and/or methods. Certain exemplary systems can comprise a tower that is constructed to provide energy via the multi point power charger.

Definitions

Throughout the entire specification, including the claims, the following terms shall have the indicated meanings. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a/an—the articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

about/approximately—as used in the specification and claims, the terms "about" and "approximately" are used interchangeably to mean plus or minus one-half of a significant digit unless the context implies otherwise. For example, "about 10" means plus-or-minus 5, i.e., from 5 to 15, whereas "about 10.0" means plus-or-minus 0.05, i.e., 9.95 to 10.05.

activity—an action, act, step, and/or process or portion thereof

Ad Hoc network—a network that forms substantially without prior preparation.

alternating current—an electric current that periodically reverses direction.

and/or—the term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

anode—the negative electrode from which electrons flow out.

antenna—a device and/or system constructed to radiate and/or receive electromagnetic waves.

apparatus—an appliance or device for a particular purpose associate—to join, connect together, and/or relate.

automatically—acting or operating in a manner essentially independent of external influence or control. For example, an automatic light switch can turn on upon "seeing" a person in its view, without the person manually operating the light switch.

base band processor—a portion of a multi point power charger that receives electrical energy via a direct current and outputs a plurality of direct current energy streams to a radio frequency processor.

battery—a device and/or system comprising one or more electrochemical cells that transform chemical energy into electricity.

beam—a ray of electromagnetic energy.

calculate—compute.

can—is capable of, in at least some embodiments.

cause—to produce an effect.

charge—to cause to store electrical energy such as in a battery.

charging beam—a ray of energy transmitted substantially along a line extending from a multi point power charger toward a determined location of an electronic device, which ray of energy has capacity to charge a battery of the electronic device.

cathode—the positive electrode to which electrons flow in.

circuit—an electrically conductive pathway and/or a communications connection established across two or more switching devices comprised by a network and between corresponding end systems connected to, but not comprised by the network.

comprising—in the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. Any process or apparatus described herein can be comprised of, can consist of, or can consist essentially of any one or more of the described elements. Moreover, steps in a process may be carried out in any order and are not limited to the order in which they are listed.

configure—to make suitable or fit for a specific use or situation.

constructed to—made to and/or designed to.

control—to manage or regulate.

controller—a unit or system to provide supervisory control which may include software and/or electronic circuitry that may include interfacing hardware, sensing circuitry, and/or communication buses.

convert—to transform, adapt, and/or change.

converter—a portion of a multi point power charger that receives alternating current electrical energy and outputs direct current electrical energy, or that receives direct current electrical energy and outputs direct current electrical energy at a different voltage.

couple—to join, connect, and/or link together.

create—to bring into being.

current—a flow of electric charge between two points via a conductor.

data—distinct pieces of information, usually formatted in a special or predetermined way and/or organized to express concepts.

define—to establish the outline, form, or structure of detect—to discover an existence or presence of something.

detector—a device and/or system constructed to detect the presence of electromagnetic waves.

determine—to obtain, calculate, decide, deduce, and/or ascertain.

device—a machine, manufacture, and/or collection thereof.

direct—to send substantially along a line to a determined location of an electronic device.

direct current—an electric current that flows substantially in a single direction.

directable—capable of being sent substantially along a line to a determined location of an electronic device.

direction—substantially along a line from a multi point power charger toward a determined location of an electronic device.

directional beam—a ray of energy transmitted substantially along a line extending from a multi point power charger toward a determined location of an electronic device.

dynamically—done in real time and without prior planning.

electrical energy—power absorbed or delivered via an electrical circuit.

electrical energy source—a power supply from a power generator.

electrical grid router—a device and/or system that forwards energy packets between devices and/or systems.

electrolyte—a liquid or gel that contains ions and can be decomposed by electrolysis, e.g., that is present in a battery electromagnetic radiation—waves (or their quanta, photons) of an electromagnetic field, propagating through space-time, carrying electromagnetic radiant energy; examples comprise radio waves, microwaves, infrared, visible light, ultraviolet, X-rays, and gamma rays.

electromagnetic radiation processor—a portion of a multi point power charger system that and outputs a plurality of electromagnetic radiation streams.

electronic—a system constructed to process electrical signals.

electronic device—a device comprising circuitry with active semiconductors and/or passive elements. Electronic devices comprise televisions, DVD players, laptops, desktop computers, mobile phones, iPods, iPads, cameras, fans, ovens, washing machines, game consoles, printers and/or radios, etc.

energy detector—a device and/or system that senses wireless energy.

emit—to send forth.

energy—a property that must be transferred to an object in order to perform work on, or to heat, the object.

energy source—an origin of electricity or something from which electricity can be derived; examples are generators and/or transmission lines of electrical AC or DC current, wind, solar, and/or biomass where power is generated or collected to be distributed to energy consuming entities estimate—to calculate and/or determine approximately and/or tentatively.

expand—to extend in distance.

follow—to track something that is in motion.

fuel cell—a device producing an electric current directly from a chemical reaction.

general location—an approximate estimate of a place occupied by something.

generate—to create, produce, give rise to, and/or bring into existence.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

illumination—an act of emitting light energy.

indicate—to be a sign of.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

LAN—An internal computer network located on one site, as opposed to a wide area network, which links different offices or sites of an organization together; listed herein to include "wireless LAN".

LAN mobile energy consuming devices—a LAN of communicatively coupled devices comprising moving cars, trucks, trains, motorcycles, and/or any other device that uses public and private roads that utilize energy to perform their functions.

LAN of energy consuming fixed buildings—a LAN of communicatively coupled structures comprising houses, office buildings, and/or government buildings that utilize energy for their function.

LAN of energy consuming flying objects—a LAN of communicatively coupled systems comprising unmanned aerial vehicles, planes, satellites and/or flying cars.

LAN of indoor energy consuming devices—a LAN of communicatively coupled devices comprising cell phones, laptops, light bulbs, in-home entertainment centers, and/or security devices that utilize energy to function.

laser—a device and/or system that emits light through a process of optical amplification based on the stimulated emission of electromagnetic radiation.

level of charge—a quantity of electrical energy stored in something such as a battery.

light source—something that emits electromagnetic radiation within a portion of the electromagnetic spectrum that is visible to a human eye.

Local LAN of energy consuming military devices in remote areas—a LAN of communicatively coupled devices comprising devices utilized by soldiers or security personnel in friendly and/or enemy territories.

location—a place occupied by something.

long haul transmission line—a transmission line constructed to transmit electrical energy at a voltage greater than 100,000 volts.

loss—electrical energy that is environmentally dissipated.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

magnesium air battery—a battery having a magnesium anode and a salt water electrolyte, which is refuelable by replacement of the anode and/or electrolyte.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

minimize—reduce to a greatest extent possible.

motion—to relocate from a first location to a second location multi directional antenna array—a plurality of transducers arranged in a regular pattern that are constructed to directionally emit radio frequency spectrum electrical energy substantially wirelessly.

multi point power charger—a system that is constructed to provide substantially wireless electrical recharging energy to electronic devices.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

optimum power—electrical energy in a quantity that provides approximately a best result for charging an electronic device.

or—as used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

packet—a discrete instance of communication.

PAN—A personal area network located or created for a small personal area opposed to a LAN; listed herein to include a "wireless PAN".

parabolic—having a bowl shape.

plurality—the state of being plural and/or more than one.

power—to supply electrical energy in a sufficient quantity to operate something.

power booster—a device and/or system that receives a signal and retransmits the signal at an increased signal strength.

predetermined—established in advance.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

quality of service—a description or measurement of the overall performance of a service, particularly the performance seen by the users of the network.

radiant power—electrical energy that is distributed via air.

radio frequency—is any of the electromagnetic wave frequencies that lie in the range extending from approximately 3 kHz to approximately 300 GHz, which include those frequencies used for communications or radar signals.

radio frequency processor—a portion of a multi point power charger that receives a plurality of direct current energy streams from a base band processor and outputs phase shifted direct current energy streams to an antenna array.

range—an extent to which a directional beam can travel and still be capable of charging or powering an electronic device.

real time—relating to systems that provide an absolute deterministic response to an event. Such a response is not based on average event time. Instead, in such systems, the deadlines are fixed and the system must guarantee a response within a fixed and well-defined time. Systems operating in real-time typically interact at a low level with physical hardware via embedded systems, and can suffer a critical failure if time constraints are violated. A classic example of a real-time system is the anti-lock brakes on a car. The real-time constraint, or deadline, in this system is the time in which the brakes must be released to prevent the wheel from locking. Another example is a car engine control system, in which a delayed control signal might cause engine failure or damage. Other examples of real-time systems include medical systems such as heart pacemakers and industrial process controllers.

receive—to get as a signal, take, acquire, and/or obtain.

recharge—to restore an electrical potential to something via providing electrical energy.

recommend—to suggest, praise, commend, and/or endorse.

redirect—to change a direction of something.

reduce—diminish in magnitude.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

request—to express a desire for and/or ask for.

responsive—reacting to an influence and/or impetus.

route—to forward energy packets to a predetermined destination.

saltwater battery—a battery that employs a concentrated saline solution, e.g., seawater, as its electrolyte.

select—to make a choice or selection from alternatives.

self-charge—to restore an electrical potential to something substantially without coupling to via one or more wires to electrical energy.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

speed—a rate at which something takes place (e.g., charging an electronic device).

store—to place, hold, and/or retain data, typically in a memory.

substantially—to a great extent or degree.

system—a collection of mechanisms, devices, machines, articles of manufacture, processes, data, and/or instructions, the collection designed to perform one or more specific functions.

system controller—an information device that regulates electrical energy flow magnitudes and directions in a multi point power charger.

tower—a structure constructed for network transmission and/or reception of electromagnetic energy.

transmission—the broadcasting of electromagnetic waves from one location to another, as from a transmitter.

transmit—to send as a signal, provide, furnish, and/or supply.

unmanned aerial vehicle—an aircraft without a human pilot aboard.

update—to change based upon new or more accurate information.

update—to incorporate new or more accurate information in a database, program, and/or procedure.

user interface—any device for rendering information to a user and/or requesting information from the user. A user interface includes at least one of textual, graphical, audio, video, animation, and/or haptic elements.

A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via—by way of and/or utilizing.

vicinity—in a region in proximity to something.

voltage—a difference in electric potential between two points.

weight—a value indicative of importance.

WiGL routing policy—a system of defined rules embodied in machine instructions that guide decisions in transferring energy wirelessly to electronic devices.

WiGL routing table—a data structure of defined rules that can be queried by machine instructions to guide decisions in transferring energy to electronic devices.

wireless—a transfer of information or power between two or more points that are not connected by an electrical conductor.

wireless electrical grid policy—a system of defined rules embodied in machine instructions that guide decisions in transferring energy wirelessly to electronic devices.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.)

that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein. Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
    an ad hoc local area network comprising a multi point wireless power charger and an electrical energy source, the multi point power charger coupleable to the electrical energy source, the multi point power charger constructed to emit a plurality of directional beams, wherein each of the plurality of directional beams is directable toward a determined direction of an electronic device with a receiver, the multi point power charger constructed to wirelessly charge or power the electronic device,
    the multi point power charger comprising:
        a plurality of converters that are constructed to convert electrical energy from the electrical energy source having an alternating current or direct current into wireless electrical energy;
        a base band processor;
        a processor comprising a plurality of local oscillators, a plurality of band pass filters, a plurality of phase shifters, and a plurality of power amplifiers;
        a multidirectional antenna array constructed to emit substantially wireless directional beams, wherein each substantially wireless directional beam flows to the antenna via one of the plurality of local oscillators, one of the plurality of band pass filters, one of the plurality of phase shifters, and one of the plurality of power amplifiers, the wireless directional beams:
            directed in any of a plurality of directions; and
            transmitted substantially wirelessly via a locally available electromagnetic energy spectrum; and
        a system controller constructed to:
            detect a type of the electrical energy source and activate a one of the converters compatible with the detected type of the electrical energy source;
            enable the electronic device to be followed by the electromagnetic energy spectrum charging beam responsive to motion of the electronic device; and
            allow for formation of the ad hoc network and repeatedly calculate a position of the electronic device so as to redirect the electromagnetic energy spectrum charging beam;
        wherein the electronic device requests charging;
        wherein the multi point power charger is constructed to:
            determine a location of the electronic device;
            direct one of the plurality of directional beams toward the determined location of the electronic device to charge or power the electronic device;
            automatically update the location of the electronic device,
            redirect one of the plurality of directional beams toward the updated location of the electronic device; and
            provide a plurality of wireless electromagnetic energy spectrum transmissions into a general location, wherein the electronic device is charged is in range within which the multi point power charger can cause a self-charge or recharge, and
        wherein a charging beam is selected based on an optimum power delivered to the electronic device based on a status of the connected electrical energy source and at least one of a requested speed of charging, the proximity of available power transmission sources in the network and/or a level of charge of a battery comprised by the electronic device.

2. The system of claim 1, wherein the detection and activation are automatic.

3. The system of claim 1 wherein the plurality of converters comprises at least a first converter that is activated when a first type of the electrical energy source is detected and a second converter that is activated when a second type of the electrical energy source is detected.

4. The system of claim 3 wherein the first type of electrical energy source comprises a battery and the second type of electrical energy source comprises a fuel cell.

5. The system of claim 4 wherein the electrical energy source comprises a saltwater battery.

6. The system of claim 5 wherein the saltwater battery comprises a magnesium-air battery.

7. The system of claim 1, wherein:
    the multi point power charger is constructed to provide the plurality of electromagnetic energy beams into the general location, whereby the electronic device is charged when in a range within which the multi point power charger can self-charge or recharge;
    a signal is received by the multi point power charger indicating:
    that a charging request has been received from the electronic device; and
    which of the plurality of directional beams will be providing electrical energy to the electronic device; and
    the multi point power charger is one of a plurality of the multi point power chargers; and
    a signal is received by the multi point power charger indicating:
    that a charging request has been received from the electronic device; and
    which of the plurality of multi point power chargers will be providing electrical energy to the electronic device.

8. The system of claim 1, wherein:
    the multi point power charger is constructed to provide electrical energy wirelessly to any detected device that requests electrical energy.

9. The system of claim 1, wherein:
    the multi point power charger is one of a plurality of multi point chargers; and
    the multi point power charger is dynamically selected from the plurality of multi point chargers based upon the determined location of the electronic device.

10. The system of claim 1, further comprising:
    machine instructions that cause the electronic device to be charged via the multi point power charger.

11. A method comprising:
    causing an electronic device, coupled to an ad hoc local area network comprising an electrical energy source, to charge or be powered via a multi point wireless power charger, the multi point power charger coupleable to the local area network and connected to the electrical energy source comprising a first type of power source or a second type of power source, the multi point power charger comprising a controller to detect the type of the connected electrical energy source,
    wherein the multi point power charger comprises at least first and second converters, the first converter activated by the controller to convert electrical energy from the first type of power source into wireless electrical energy when the first type of power source is detected by the controller and the second converter activated by the controller to convert electrical energy from the second type of power source into wireless electrical energy when the second type of power source is detected;
    wherein the multi point power charger constructed to direct a beam of electrical energy toward the electronic device, the multi point power charger comprising a processor and an antenna, the processor comprising a plurality of local oscillators, a plurality of band pass filters, a plurality of phase shifters, and a plurality of power amplifiers, wherein the beam of electrical energy flows to the antenna via one of the plurality of local oscillators, one of the plurality of band pass filters, one of the plurality of phase shifters, and one of the plurality of power amplifiers, the multi point power charger responsive to a first determination of a location of the electronic device and a second determination that a charging request has been received from the electronic device, the beam of electrical energy directed responsive to the determination of the location of the electronic device, wherein the electronic device requests charging;
    wherein the multi point power charger is constructed to:
        determine the location of the electronic device;
        direct one of the plurality of directional beams toward the determined location of the electronic device to charge or power the electronic device;
        automatically update the location of the electronic device,
        redirect one of the plurality of directional beams toward the updated location of the electronic device; and
        provide a plurality of wireless electrical power transmission into a general location, wherein the electronic device is charged in a range within which the multi point power charger can cause a self-charge or recharge; and
    wherein a charging element is selected based on an optimum power delivered to the electronic device based on the type of the connected electrical energy power source detected by the controller and at least one of:
        a requested speed of charging;
        a level of charge of a battery comprised by the electronic device; and/or
        a status of the connected electrical energy source.

12. The method of claim 11, wherein the detection of the type of the connected electrical energy source and activation of the first or second converter are automatic.

13. The method of claim 11 wherein the first type of electrical energy source comprises a battery and the second type of electrical energy source comprises a fuel cell.

14. The method of claim 11 wherein the first type of electrical energy source comprises a salt water battery.

15. The method of claim 14 wherein the salt water battery comprises a magnesium-air battery.

16. The method of claim 11, further comprising: automatically updating the location of the electronic device.

17. The method of claim 11, further comprising: receiving a request to charge the electronic device.

18. The method of claim 11, wherein: radio frequency charging power is dynamically controlled to reduce losses in radiant power in the vicinity of devices to be charged.

19. A portable wireless charging apparatus, comprising:
    a housing in which are mounted a power source and a wireless charging unit connected to the power source;
    the power source comprising a battery or a fuel cell;
    the wireless charging unit comprising a first converter for converting power from the battery when the battery is connected and a second converter for converting power from the fuel cell when the fuel cell is connected;
    a system controller in the wireless charging unit to detect whether the connected power source is the battery or the fuel cell, activate the first converter and inactivate the second converter when the battery is detected, and activate the second converter and inactivate the first converter when the fuel cell is detected;
    an ad hoc local area network comprising the wireless charging unit and an electronic device with a receiver, the wireless charging unit constructed to emit a plurality of directional beams, wherein each of the plurality of directional beams is directable toward a determined direction of the electronic device, the multi point power charger constructed to wirelessly charge or power the electronic device,
    the multi point power charger comprising:
        a base band processor;
        an electromagnetic spectrum processor comprising a plurality of local oscillators, a plurality of band pass filters, a plurality of phase shifters, and a plurality of power amplifiers;
        a multidirectional antenna array, the multidirectional antenna array constructed to emit substantially wireless directional beams, wherein each substantially wireless directional beam flows to the antenna via one of the plurality of local oscillators, one of the plurality of band pass filters, one of the plurality of phase shifters, and one of the plurality of power amplifiers, the wireless directional beams:
            directed in any of a plurality of directions; and
            transmitted substantially wirelessly via a locally available electromagnetic energy spectrum; and
        wherein the system controller is constructed to:
            enable the electronic device to be followed by the electromagnetic energy spectrum charging beam responsive to motion of the electronic device; and
            allow for formation of the ad hoc network and repeatedly calculate a position of the electronic device so as to redirect the electromagnetic energy spectrum charging beam; wherein:
            the electronic device requests charging;
            the multi point power charger is constructed to:
                determine a location of the electronic device;
                direct one of the plurality of directional beams toward the determined location of the electronic device to charge or power the electronic device;
                automatically update the location of the electronic device,
                redirect one of the plurality of directional beams toward the updated location of the electronic device; and provide a plurality of wireless electromagnetic energy spectrum transmissions into a general location, wherein the electronic device is charged in range within which the multi point power charger can cause a self-charge or recharge, and wherein a charging beam is selected based on an optimum power delivered to the electronic device based on a status of the connected power source and at least one of a requested speed of charging, the proximity of available power transmission sources in the network and/or a level of charge of a battery comprised by the electronic device.

20. The portable wireless charging apparatus of claim 19, wherein the detection of the power source and activation of the first or second converter are automatic.

21. The portable wireless charging apparatus of claim 19, wherein the battery is connected and comprises a saltwater battery.

22. The portable wireless charging apparatus of claim 21, wherein the battery comprises a magnesium-air battery, wherein the magnesium air battery comprises replaceable magnesium anodes, an electrolyte fill port and an electrolyte drain.

23. The portable wireless charging apparatus of claim 19, further comprising a power switch and a panel with one or more status indicators.

24. The portable wireless charging apparatus of claim 19, further comprising a plurality of USB ports electrically connected to the power source to wiredly charge or power one or more electronic devices tethered to the USB ports.

\* \* \* \* \*